(12) United States Patent
Arnold

(10) Patent No.: US 6,545,852 B1
(45) Date of Patent: Apr. 8, 2003

(54) SYSTEM AND METHOD FOR CONTROLLING AN ELECTROMAGNETIC DEVICE

(75) Inventor: James H. Arnold, Moberly, MO (US)

(73) Assignee: Ormanco, Moberly, MO (US)

(*) Notice: Subject to any disclaimer, the term of this patent is extended or adjusted under 35 U.S.C. 154(b) by 0 days.

(21) Appl. No.: 09/413,356

(22) Filed: Oct. 6, 1999

Related U.S. Application Data
(60) Provisional application No. 60/103,381, filed on Oct. 7, 1998.

(51) Int. Cl.[7] ............................................. H01H 9/00
(52) U.S. Cl. ...................................... 361/160; 361/152
(58) Field of Search ........................... 361/115, 18, 1, 361/160, 152

(56) References Cited

U.S. PATENT DOCUMENTS

| | | | |
|---|---|---|---|
| 3,089,064 A | 5/1963 | Cotton de Bennetot | 317/123 |
| 3,428,867 A | 2/1969 | Becker | 317/123 |
| 3,590,605 A * | 7/1971 | Low | 68/12 |
| 3,693,110 A * | 9/1972 | Briggs, Jr. et al. | 331/47 |
| 3,740,615 A | 6/1973 | Vigini | 317/148.5 R |
| 3,789,876 A | 2/1974 | Kempton et la. | 137/554 |
| 3,854,695 A | 12/1974 | Baugh | 251/129 |
| 4,004,258 A | 1/1977 | Arnold | 335/17 |
| 4,041,546 A | 8/1977 | Stewart | 361/152 |
| 4,059,844 A | 11/1977 | Stewart | 361/152 |
| 4,082,369 A * | 4/1978 | Black et al. | 303/3 |
| 4,112,365 A | 9/1978 | Larson et al. | 324/173 |
| 4,262,320 A | 4/1981 | Herron | 361/191 |
| 4,295,111 A | 10/1981 | Wang | 335/256 |
| 4,295,177 A | 10/1981 | Woodhouse et al. | 361/154 |
| 4,321,946 A | 3/1982 | Paulos et al. | 137/554 |
| 4,341,241 A | 7/1982 | Baker | 137/554 |
| 4,453,652 A | 6/1984 | Merkel et al. | 222/504 |
| 4,490,771 A | 12/1984 | Huber et al. | 361/154 |
| 4,553,890 A | 11/1985 | Gulistan | 411/318 |
| 4,620,173 A | 10/1986 | O'Brien | 335/205 |
| 4,631,627 A | 12/1986 | Morgan | 361/153 |
| 4,645,271 A | 2/1987 | Brearey et al. | 303/14 |
| 4,680,667 A | 7/1987 | Petrie | 361/154 |
| 4,690,168 A | 9/1987 | Kihm | 137/554 |
| 4,700,304 A * | 10/1987 | Byrne et al. | 364/426 |
| 4,729,056 A | 3/1988 | Edwards et al. | 361/153 |
| 4,733,212 A | 3/1988 | Goodwin | 335/253 |
| 4,749,891 A | 6/1988 | Sheng | 310/15 |
| 4,757,418 A | 7/1988 | Bruckner | 361/155 |
| 4,797,779 A | 1/1989 | Richards et al. | 361/154 |
| 4,809,742 A | 3/1989 | Grau | 137/554 |
| 4,810,952 A | 3/1989 | Cohen | 323/300 |
| 4,810,964 A | 3/1989 | Granberg et al. | 324/207 |
| 4,845,420 A | 7/1989 | Oshizawa et al. | 323/222 |
| 4,878,147 A | 10/1989 | Oyama et al. | 361/154 |
| 4,907,901 A | 3/1990 | Mitchell | 400/157.2 |
| 4,950,985 A | 8/1990 | Voss et al. | 324/207.16 |
| 4,950,987 A | 8/1990 | Vranish et al. | 324/207.23 |
| 4,953,590 A | 9/1990 | Kakinuma et al. | 137/554 |
| 4,970,622 A | 11/1990 | Buchl | 361/154 |
| 4,980,793 A | 12/1990 | Glowczewski et al. | 361/154 |
| 5,032,812 A | 7/1991 | Banick et al. | 335/17 |
| 5,036,961 A | 8/1991 | Eberling et al. | 192/1.23 |
| 5,045,786 A | 9/1991 | Fischer | 324/207.16 |
| 5,115,193 A | 5/1992 | Bean et al. | 324/207.12 |
| 5,121,018 A | 6/1992 | Oldakowski | 310/77 |
| 5,139,315 A | 8/1992 | Walenty et al. | 303/95 |
| 5,180,978 A | 1/1993 | Postma et al. | 324/207.16 |

(List continued on next page.)

Primary Examiner—Stephen W. Jackson
(74) Attorney, Agent, or Firm—Michael D. Bednarek; Shaw Pittman LLP

(57) ABSTRACT

A system and method for controlling an electromagnetic device is disclosed. The system includes provisions for diagnosing problems, sensing malfunctions, and monitoring faults that may occur within the system and the controlled electromagnetic device. The system provides various forms of feedback to a user. The system includes back-up operating systems in cases of failure.

4 Claims, 10 Drawing Sheets

U.S. PATENT DOCUMENTS

| | | | |
|---|---|---|---|
| 5,185,542 A | 2/1993 | Lazorchak | 310/36 |
| 5,196,983 A | 3/1993 | Stumpf | 361/154 |
| 5,218,308 A | 6/1993 | Bosebeck et al. | 324/654 |
| 5,241,218 A | 8/1993 | Page | 307/104 |
| 5,250,883 A | 10/1993 | Okada | 318/494 |
| 5,250,884 A | 10/1993 | Okumura | 318/560 |
| 5,258,669 A | 11/1993 | Nakashima | 307/530 |
| 5,270,900 A | 12/1993 | Alden et al. | 361/153 |
| 5,289,131 A | 2/1994 | Heidt et al. | 324/415 |
| 5,347,419 A | 9/1994 | Caron et al. | 361/154 |
| 5,370,449 A | 12/1994 | Edelen et al. | 303/3 |
| 5,404,303 A | 4/1995 | Pattantyus et al. | 364/426.02 |
| 5,422,593 A | 6/1995 | Fujihira | 327/561 |
| 5,422,780 A | 6/1995 | Lignar | 361/152 |
| 5,424,637 A | 6/1995 | Oudyn et al. | 324/207.16 |
| 5,428,496 A | 6/1995 | Buchta | 361/152 |
| 5,438,489 A | 8/1995 | Judy et al. | 361/191 |
| 5,443,132 A | 8/1995 | Arnold | 188/138 |
| 5,450,276 A | 9/1995 | Olifant et al. | 361/152 |
| 5,457,364 A | 10/1995 | Bilotti et al. | 318/434 |
| 5,463,263 A | 10/1995 | Flynn | 310/181 |
| 5,470,043 A | 11/1995 | Marts et al. | 251/65 |
| 5,481,237 A | 1/1996 | Sarfati et al. | 335/278 |
| 5,497,093 A | 3/1996 | Sundeen et al. | 324/415 |
| 5,529,281 A | 6/1996 | Brudnicki et al. | 251/129.03 |
| 5,541,806 A | 7/1996 | Hoffman | 361/160 |
| 5,583,434 A | 12/1996 | Moyers et al. | 324/207.16 |
| 5,594,384 A | 1/1997 | Carroll et al. | 324/369 |
| 5,630,489 A | 5/1997 | Bebernes | 192/4 C |
| 5,632,468 A | 5/1997 | Schoenmeyr | 251/129.15 |
| 5,657,002 A | 8/1997 | Ogden | 340/650 |
| 5,667,282 A | 9/1997 | Kim | 303/3 |
| 5,701,109 A | 12/1997 | Poulsen | 335/78 |
| 5,704,693 A | 1/1998 | Mackiewicz | 303/3 |
| 5,809,441 A * | 9/1998 | McKee | 701/51 |
| 5,957,551 A | 9/1999 | Maron et al. | 303/191 |
| 6,015,194 A | 1/2000 | Decker | 303/155 |
| 6,019,436 A | 2/2000 | Siepker | 303/13 |
| 6,158,822 A | 12/2000 | Shirai et al. | 303/3 |

* cited by examiner

O-SCOPE II

| Channel 1 | | * Channel 2 | |
|---|---|---|---|
| 500 mV/Div | | 500 mV/Div | |
| 0.000 V Off. | | 0.000 V Off. | |
| DC | | DC | |
| On  CH Mode | | On  CH Mode | |
| 1 Probe X | | 1 Probe X | |
| 0 Vert. Pos. | | 0 Vert. Pos. | |

| | | | |
|---|---|---|---|
| $V_{rms}$ | 0.393 | $V_{rms}$ | 0.008 |
| $V_{pp}$ | 1.207 | $V_{pp}$ | 0.281 |
| $V_{peak}$ | 1.195 | $V_{peak}$ | 0.012 |
| $V_{min}$ | -0.012 | $V_{min}$ | -0.270 |
| $V_{dc}$ | 0.239 | $V_{dc}$ | 0.006 |
| $F(Hz)$ | 22.22 | $F(Hz)$ | 0.00 |
| $P(ms)$ | 45.00 | $P(ms)$ | 2.00 |
| $V_{dB}$ | -5.89 | $V_{dB}$ | -39.41 |

*FIG. 3A*

O-SCOPE II

| Channel 1 | | * Channel 2 | |
|---|---|---|---|
| 2 V/Div | $V_{rms}$ 3.648 | 10 V/Div | $V_{rms}$ 0.000 |
| 0.000 V Off. | $V_{pp}$ 7.782 | 0.000 V Off. | $V_{pp}$ 0.000 |
| DC | $V_{peak}$ 4.313 | AC | $V_{peak}$ |
| On  CH Mode | $V_{min}$ -3.469 | Off  CH Mode | $V_{min}$ |
| 1 Probe X | $V_{dc}$ 3.517 | 1 Probe X | $V_{dc}$ 0.000 |
| 0 Vert. Pos. | F(Hz) 45.20 | 0 Vert. Pos. | F(Hz) |
| | P(ms) | | P(ms) |
| | $V_{dB}$ 13.46 | | $V_{dB}$ -240.000 |

FIG. 4A

SYSTEM AND METHOD FOR CONTROLLING AN ELECTROMAGNETIC DEVICE

RELATED APPLICATIONS

This application claims priority to U.S. provisional patent application No. 60/103,381, entitled Method and System for Latch-Up Detector and Electrical Driver for Magnetically Biased/Latched Mechanisms and the Like, filed on Oct. 7, 1998.

BACKGROUND

1. Field of the Invention

The present invention relates generally to operation of bi-stable and mono-stable magnetic latching mechanisms, and more particularly to a device, method, and system for bi-stable and mono-stable magnetic latching mechanisms in safety related applications such as automotive brake systems and control mechanisms for the power industry, nuclear and conventional, that utilize permanent magnetic latching devices in control and safety systems.

2. Background of the Invention

The new generation of pulse operated magnetic latching devices require a bi-polar pulse in order for the magnetic latching device to operate as intended or designed. This divergence from traditional driving method of constant powered devices has caused or created problems in finding method(s) of effectively operating this generation of magnetic devices, especially units requiring substantial power operating in operationally critical environments. These pulse operated short duty cycle devices generate more 'switching/change-over force' than their constant powered counterparts, but lack the user confidence of the constant powered devices.

Manufacturers and users of these new magnetic latching devices have learned that just providing a pulse to the unit with no position indicator or operations indicator is not sufficient to meet today's safety requirements and provide the operators or other users with the assurance of correct operation. The continuously powered devices, which are being replaced by the new generation of magnetic latching devices, have an inherent built-in safety mechanism and operational confidence lacking in the new magnetic latching designs.

Several manufacturers have attempted to address these problems by adding switches, modifying the magnetic circuitry to cause closure of a magnetic switch at one position, or developing electronics to monitor position by determining induction value of the magnetic assembly or visual indicators.

Another approach used by manufacturers and users is to over drive the magnetic latching mechanism by providing a higher voltage pulse of longer duration than required in order to establish an operating confidence level with the magnetic latching device. This causes heating of the brake or clutch, damage to the winding installation, and excessive power consumption, all of which the design was supposed to overcome.

The automotive environment does not make wide use of bi-polar power drivers that are required to operate these medium to high power driver requirements. (There appear to be no, or at least very few, high power, 30A, Double Pole Double Throw relays for automotive applications.) The industrial environment provides a better source for high power double pole double throw relays than the automotive industry, but lacks an economical method of providing the bi-polar electrical pulse necessary to correctly drive or operate the new generation of magnetic latching devices and mechanisms.

Various sources provide background information relating to different aspects or components of the invention. For example, patents and reference data books provide background information related to the present invention.

The following sources provide information related to peak detectors: (1) National Semiconductor Data Acquisition Databook, Operational Amplifier Databook, Power ICs Databook, and Application Specific Analog Products Databook; (2) Texas Instruments; (3) Fairchild; (4) Encyclopedia of Electronic Circuits, vols. 1–6; (5) Heath/Zenith Continuing Education; Electronic Technology Series; Operational Amplifiers; (6) Electronics Circuit Manual; (7) Linear Technology, 1994 Linear Databook, volume III; and (8) Sourcebook of Electronic Circuits.

Several references, mainly patent documents, provide background information related to position sensors and methods of determining position of an electromechanical device. Generally, these devices range from a modified magnetic circuit that incorporates a magnetic flux sensor to alternating current frequency determination based upon inductive value of the magnetic assembly to physical position indicators.

U.S. Pat. No. 3,089,064 to De Bennetot, entitled Combined Permanent Magnet and Electromagnet, which issued May 7, 1963, shows a Double Pole Double Throw (DPDT) switch controlling the operation of a permanent magnet assembly, which consists of a combination of parallel permanent and electromagnets.

U.S. Pat. No. 3,428,867 to M. C. Becker, entitled Method and Apparatus for Controlling the Useful Magnetornotive Force Of A Permanent Magnet, teaches use of a DPDT switch to control the flow of electrical current in a device using both permanent and electromagnets in a series magnet circuit.

U.S. Pat. No. 3,789,876 to Calvin E. Kempton and Robert H. Reinicke teaches a method of using an alternating current to determine the position of a solenoid armature with any mechanical connections to the armature (solenoid valve with electronic position indicator).

U.S. Pat. No. 4,004,258 to Kurt Arnold teaches a method of modifying the magnetic circuit path to create a flux gap in which a magnetic sensor is used to determine the position of an armature (position indicating latching solenoid).

U.S. Pat. No. 4,059,844 to John W. Stewart demonstrates methods of controlling current to a solenoid (solenoid driver circuit). U.S. Pat. No. 4,262,320 to Lee F. Herron shows a method of operating latching solenoids using an H-switching configuration (H-switch configuration for controlling latching solenoids).

U.S. Pat. No. 4,321,946 to Louis B. Paulos uses a differentiating network to monitor the current flow through a current sensing resistor to control a dual battery driver operating a monostable spring return solenoid to provide visual indicators (armature position monitoring and control device).

U.S. Pat. No. 4,341,241 to Joseph W. Baker uses a mechanical switch to indicate the position of a armature in a valve mechanism (position indicating valve means).

U.S. Pat. No. 4,490,771 to Siefried Huber and Manfred Merkator teaches a method of using an electrical control mechanism to use a portion of the electrical sine wave from a power line to operate a solenoid (control circuit arrangement for an electromagnetically operated power tool).

U.S. Pat. No. 4,620,173 to Robert B. O'Brien shows a method of using magnetic reed switches to show the position of a permanent magnet attached to a solenoid plunger (latching magnetic actuator).

U.S. Pat. No. 4,631,627 to Ronald E. Morgan teaches a method of controlling a relay which operates a motor (impulse operated relay system).

U.S. Pat. No. 4,733,212 to Arthur V. Goodwin, titled Pulse Latching Solenoid, shows a mechanical approach to determining the position of a solenoid armature.

U.S. Pat. No. 4,810,952 to Burton E. Cohen teaches a power delivery method for operating a fastening machine solenoid (circuitry and method for controlling power to fastener machine solenoid).

U.S. Pat. No. 4,810,964 contains a method and apparatus for measuring the distance between a measuring transducer and an opposing surface, particularly with paper pulp equipment.

U.S. Pat. No. 4,950,985 to Thomas Voss et al. teaches a method of determining the position of an armature in a magnetic system by using an alternating current (apparatus for measuring electromagnetic values of a coil, in particular for measuring the position of armature of a coil/armature magnetic system).

U.S. Pat. No. 5,121,018 to Stephen Z. Oldakowski, titled Latching Brake Using Permanent Magnet, teaches the use of parallel electromagnets and permanent magnets in a latching environment to operate a spring applied magnetic release brake operated by a bi-polar pulse.

U.S. Pat. No. 5,632,468 to Ivar Schoenmeyr uses a conventional power supply that rectifies and filters alternating current to provide direct current source of power allowing a solid state switch means to operate a solenoid (Control circuit for solenoid valve).

U.S. Pat. No. 4,970,622 to Josef Bilchl teaches a method of using the slope of the DC charging current energizing an electromagnet to develop an activation frequency of the magnetic assembly (method and apparatus for controlling the operation of an electromagnet). This frequency is compared to a predetermined value to provide an indication of the position of the armature.

U.S. Pat. No. 5,185,542 to Edward D. Lazorchak, titled Electromagnetic Pulse Operated Bi-Stable Brake, shows a series permanent magnet and electromagnet operating a spring applied magnetic released pulse operated brake.

U.S. Pat. 5,196,983 to Paul B. Stumpf teaches a method of using alternating current to determine the position of a solenoid plunger (solenoid engagement sensing circuit).

U.S. Pat. No. 5,241,218 to Michael Page teaches a method of detecting the current dip caused by a solenoid plunger, armature, seating to detect correct operation of a solenoid. The electronic detection circuit activates a single visual indicator, light emitting diode (LED) (Armature movement detector circuit).

U.S. Pat. No. 5,250,883 to Tadashi Okada teaches a motor control circuitry for starting and stopping a multi-speed motor (motor drive control apparatus).

U.S. Pat. No. 5,347,419 to LaVerrie A. Caron, et al., shows a digital approach of controlling the operating current to a solenoid (current limiting solenoid driver).

U.S. Pat. No. 5,443,132 to James H. Arnold, entitled Magnetic Latching Mechanism and Method Particularly for Brakes, teaches a method of manipulating magnetic field at the operating faces of pole pieces by alternately canceling the magnetic field on one operating face while enforcing the magnetic field on the other operating face by the same amount of magnet energy.

U.S. Pat. No. 5,583,434 to John C. Moyers, et al., teaches a method of injecting an alternating current into the direct current operating circuit of a DC solenoid to determine the position of the solenoid (method and apparatus for monitoring armature position in direct-current solenoids).

U.S. Pat. No. 5,701,109 to Peter Ulrik Poulsen demonstrates a unique method of using buck/boost magnetic principles to operate a current sensing relay used for inductive loads that does not have the in-rush currents associated with it) motors (current sensing relay).

Other patents of relevant to background of the present invention include the following: U.S. Pat. No. 3,740,615 relates to an activating and confirming device for printing electromagnets. U.S. Pat. No. 3,854,695 describes an electromagnet control apparatus. U.S. Pat. No. 4,004,258 relates to a position indicating latching solenoid. U.S. Pat. No. 4,041,546 describes a solenoid driver circuit. U.S. Pat. No. 4,112,365 is for a position detecting system.

The following patents provide additional background information. U.S. Pat. No. 4,295,111 (low temperature latching solenoid); U.S. Pat. No. 4,295,177 (control circuits for solenoids); U.S. Pat. No. 4,453,652 (controlled current solenoid driver circuit); U.S. Pat. No. 4,680,667 (solenoid driver control unit); U.S. Pat. No. 4,690,168 (valve actuator position indicating system); U.S. Pat. No. 4,729,056 (solenoid driver control circuit with initial boost voltage); U.S. Pat. No. 4,533,890 (permanent magnet bi-stable solenoid actuator); U.S. Pat. No. 4,749,891 (non-linear electromagnetic vibration device); U.S. Pat. No. 4,757,418 (solenoid driver circuit); U.S. Pat. No. 4,797,779 (pulsed power supply); U.S. Pat. No. 4,809,742 (control valve assembly including valve position sensor); U.S. Pat. No. 4,845,420 (drive circuit device for inductive load); U.S. Pat. No. 4,878,147 (electromagnetic coil drive device); U.S. Pat. No. 4,907,901 (method and apparatus for measuring displacement of a moveable member of an electromagnetic device by using perturbations in the device's energizing current); U.S. Pat. No. 4,950,987 (magneto-inductive sensor for performing tactile and proximity sensing); U.S. Pat. No. 4,953,590 (electromagnetic directional control valve); U.S. Pat. No. 4,980,793 (open loop control of solenoid coil driver); U.S. Pat. No. 5,032,812 (solenoid activator having a magnetic flux sensor); U.S. Pat. No. 5,045,786 (circuit for measuring a variable inductance connected in series with a fixed inductance); U.S. Pat. No. 5,115,193 (inductive linear displacement transducer and temperature-compensating signal processor); U.S. Pat. No. 5,180,978 (proximity sensor with reduced temperature sensitivity using AC and DC energy); U.S. Pat. No. 5,218,308 (sensor for and method of detecting the position of a piston inside the cylinder of a dashpot); U.S. Pat. No. 5,250,884 (drive controlling apparatus); U.S. Pat. No. 5,258,669 (current sense amplifier circuit); U.S. Pat. No. 5,270,900 (solenoid response detector); and U.S. Pat. No. 5,289,131 (circuit configuration for monitoring an electromagnetically actuated device, in particular an electromagnetic clutch).

Other patents containing additional background information include U.S. Pat. No. 5,404,303 (solenoid current driver circuit); U.S. Pat. No. 5,422,593 (current-limiting circuit); U.S. Pat. No. 5,422,780 (solenoid drive circuit); U.S. Pat. No. 5,424,637 (method and apparatus for determining the position of an armature in an electromagnetic actuator using observer theory); U.S. Pat. No. 5,428,496 (electronic switching arrangement); U.S. Pat. No. 5,438,489 (solenoid driver circuit and diagnostics); U.S. Pat. No. 5,450,276 (electromagnetic switch device); U.S. Pat. No. 5,457,364 (bridge motor driver with short-circuit protection and motor-current limiting feature); U.S. Pat. No. 5,463,263 (permanent magnet control means); U.S. Pat. No. 5,470,043 (magnetic latching solenoid); U.S. Pat. No. 5,481,237 (solenoid valve with electrical connection elements and integrated safety devices); U.S. Pat. No. 5,497,093 (method and apparatus for diagnosing a twin-coil, bi-stable, magnetically latched solenoid); U.S. Pat. No. 5,529,281 (dual-latching solenoid-actuated valve assembly); U.S. Pat. No. 5,541,806 (dual current sensing driver circuit with switching energization and flyback current paths); U.S. Pat. No. 5,594,384 (enhanced peak detector); and U.S. Pat. No. 5,657,002 (resettable latching indicator).

The advent of pulse operated bi-stable and mono-stable magnetic latching devices is demonstrated by the related art. However, an important shortcoming of the art is a cost effective device, system, and method of operating these devices, along with a device, system, and method of determining if the magnetic latching mechanism actually performed the requested task (i.e., whether it actually applied or released); a device, system, and method to determine the state (position) of the magnetic latching mechanism; and a device, system, and method of determining the operating condition of the electronics and magnetic latching mechanism.

SUMMARY OF THE INVENTION

It is an object of the present invention to provide a cost effective and reliable mono/bi-stable magnetic latching device for an automotive application, such as an electromagnetic/electrical parking brake, and a method and system of operation of the device.

It is a further object of the present invention to provide a device, method, and system for determining if the magnetic latching mechanism is operating as intended. It is a further object of the present invention to provide a device, method, and system for determining if the magnetic latching mechanism is latching in the position chosen. It is a further object of the present invention to provide a device, method, and system for determining the operational status of the magnetic latching mechanism and the associate electronics.

It is a further object of the present invention to provide a device, method, and system for determining a manual means of operating the magnetic latching mechanism in the event of electronics failure, in order to establish operator/user confidence in this new generation of brakes, clutches, and valves.

Since this invention takes the first comprehensive look at the requirement of operating a magnetic latching device in a safety related application, it is a further object of the present invention to set the standard and acceptance level for mechanisms that operate magnetic latching devices.

The present invention provides a novel arrangement and use of circuit elements to perform the complex task of operating a magnetic latching mechanism in a safety related application, such as a parking brake system. The present invention includes use of a microcontroller based electronic design that contains a secondary operating system, and a manual over-ride system. In combination with the primary operating system, these secondary and manual over-ride systems provide an aerospace design level of reliability for the present invention. In addition, reliability is further assured by the use of a parking brake unsafe indicator on the dash and other components to provide the user with assurance of proper operation and other information about the system functioning, including indication of transitioning of the magnetic latching device.

The present invention, which is referred to as the "Latch-Up Detector and Electrical Driver for Magnetically Biased/Latched Mechanisms and the Like" and alternatively as the "Latch-Up Detector/Driver", relates to the operation of bi-stable and mono-stable magnetic latching mechanisms in safety related applications, such as Automotive Parking Brake systems such as described in U.S. Pat. No. 5,443,132 (Arnold; Magnetic Latch Mechanism And Method Particularly For Brakes; issued Aug. 22, 1995) and control mechanisms for the power industry, nuclear and conventional, that utilize permanent magnetic latching devices in control and safety systems. The present invention is also applicable where correct operation on of a magnetic latching mechanism is critical or otherwise crucial to operation of a more complex mechanism.

The present invention includes the electrical and electronic control circuitry and other elements that drive and operate mono-stable and bi-stable brakes, clutches, and valves of spring applied, magnetically applied, or magnetic activators types in both full electronic drive modes and manual electrical modes that do not use any of advanced electronics for operation. In an embodiment of the present invention, these mechanisms are operable in full automatic operating mode with no user initiation required (computer controlled), in semi-automatic operating mode with only some user initiation required (partial computer controlled), or in a full manual operating mode, which requires full user initiated operation (user/operator control).

The Latch-Up Detector/Driver electronics include the following: 1) an operating algorithm that increases the operational effectiveness of magnetic latching devices; 2) cost efficient electrical drive circuitry that provides a bi-polar pulse to efficiently operate pulse operated magnetic devices; 3) electronic circuitry to detect latch-up that occurs when the ElectroMagnetic Assembly (EMA) within the driven mechanism changes state (changes from one position to another); 4) internal monitoring circuits that inform the operator or other user of the operating status of both the electronics and external driven mechanism; 5) an isolation resistance monitor to check the isolation resistance between the electrical winding of the electromagnets and the magnetic pole structure on which the electromagnets are wound; 6) performance monitors that monitor the time required for the magnetic assembly to change state; 7) position determining circuitry that determines the physical position of the driven mechanism; 8) an unscheduled event detector to monitor the EMA for a change in position created by such events as vibration or shock to the driven element; 9) Unswitched, Switched, and Enabled power supplies that provide the necessary power to operate the various analog and digital components contained within the mechanism; 10) voltage monitors that provide an indication of an out of tolerance voltage condition; 11) a Manual Over-Ride System that allows a method of Applying/Releasing the brake that is independent of the electronics; and 12) an Unsafe Parking Brake Indicator and associated logic that informs the driver or other user of the operating status of the parking brake system and also functions as a backup operating system in the vent of microcontroller failure.

The following features are included in an embodiment of the present invention. An Analog-to-Digital Converter (ADC) is used as a diagnostic tool in determining the operating condition of both the electronics and the external remotely operated magnetic latching mechanism. An Apply-Release Switch Operator provides introduction of the initiate fault circuitry and residual switch position memory. An Audio Enunciator is provided, which includes use of a single microcontroller 1/0 port to control the operation of an audio warning device and the ability to have two intensity levels from the single information channel. A Bi-Polar Pulse Driver is used for a 'hybrid' electrical drive using a combination of mechanical relays and solid state switches to control the operation of a bi-directional device by including the capability to generate a bi-polar signal. Also included with the Bi-Polar Pulse Driver is the use of a tapped, or split, current sensing resistor to provide a differential current flow indication. A Brake/Clutch Position Sensor using a Direct Current Pulse electrically determines the position of an armature in a bi-stable magnetic latching device. The invention also includes a Brake/Clutch Status Indicator containing the 'Parking Brake UnSafe' logic unit and indicator. The bi-polar light emitting diode (LED) driver provides individual current limiting resistors for each color of the bi-colored LED's, allowing the driving circuit to be optimized for each color, and the Electronics Control Unit (ECU) includes use of the multiplexed and microcontroller tri-state output to increase the effective number of 1/0 ports available.

The invention further includes a Fault Monitor for the use of a differential signal pair to set and reset a latching relay and control the illumination of an indicator. This feature also includes use of a circuit to record and use the residual fault indication produced by the last displayed fault indication. An operating algorithm that calculates the operating temperature of the EMA and that uses the results to control the amount of time allowed between engagements is also included with the Fault Monitor. This operating algorithm prevents heat build-up from damaging the magnetic assembly. An Isolation Resistance Monitor is provided for the use and operation of an in-line and on-line isolation resistance monitor to determine the operational status of an external electrical assembly. A Latch-Up Detector is used that includes a combination of gated differential amplifiers, shunted peak detectors, inverters, and differentials to produce a bi-polar latch-up detector.

The present invention also uses a synthetic signal to check the operation of the latch-up detector and includes integration of a Manual Over-Ride system into a pure electronic design. The Manual Over-Ride System uses the combination of mechanical and electronic system to provide enhanced operational areas (including an unscheduled event detector).

The present invention further includes an Over Voltage Detector and a Position Memory that uses a microcontroller signal pair as a sensor and a control element for sensing the change in status. The Position Memory allows use of an override setting, and control of the illumination of an indicator by using the same pair of signal lines. An embodiment of the present invention further includes a Service Brake Interface, which allows a parking-brake-by-wire design, and a Transmission Interface that allows use of the transmission range select information in the operating program of a parking-brake-by-wire system. The present invention also includes a Power Supply, a Reference Voltage Generator, an Under Voltage Detector, a Voltage Monitor, and a Serial Number, Electronic. Other features of an embodiment of the present invention include an UnScheduled Event Detector that is able to detect the unscheduled event, and that allows the unpowered changing of the latch state of a bi/mono stable magnetic device and resetting the device back to its original state. A Wave Form Generator is provided for checking the operation of the latch-up detector/driver circuitry with the use of a synthetic signal.

An embodiment of the present invention thus uses a cost effective combination of solid-state and mechanical components and relays, to form a hybrid electrical drive unit that generates a bi-polar electrical pulse in a cost effective manner. Electronic circuits monitor the operating current to detect the 'dip' caused by the 'armature' changing from one state to the other state, providing an indication of latch-up. Electrical circuits determine the position of the magnetic assembly, armature, within the magnetic latching mechanisms, and monitor voltage and current levels to provide the user with an indication of the operating condition of both the electronics and magnetic latching mechanisms. A separate electrical circuit provides a manual mode for operation of the magnetic latching mechanism.

An object of the present invention is to provide a power management system adapted for connection to a power source and an electromagnetic device wherein: the power management system determines at least one of a voltage, a current or a resistance; and wherein the system performs diagnostics on both the power management system and the electromagnetic device.

Another object of the present invention is to provide a power management system where the power management system includes a wave form generator to create a signal that is sent to the power management system and where the power management system senses the output of a position verification device.

Another object of the present invention is to provide a power management system where the position verification device detects a change in magnetic characteristics of the electromagnetic device.

In another aspect of the invention, an object of the present invention is to provide a power management system adapted for connection to a power source and an electromagnetic device where the power management system receives a signal from a switch requesting a change of state of the electromagnetic device; the electromagnetic device having a first state being an applied state and a second state being a release state; the power management system displaying a first indicia when the state of the electromagnetic device is changed from the first state to the second state and the power management system displaying a second indicia when the state of the electromagnetic device is changed from the second state to the first state.

Another object of the present invention is to provide a power management system where the power management system includes at least one parameter; the parameter being set to a failure indication, the power management system attempting to operate the electromagnetic device; the power management system sensing the operation of the electromagnetic device and if the operation of the electromagnetic device was successful, then the power management system setting the parameter to a completed cycle indication.

Another object of the present invention is to provide a power management system where the electromagnetic device further comprises a first state and a second state, a change from the first state to the second state being defined as a first change of state and a change from the second state to the first state being defined as a second change of state, where upon sensing a first change of state, the power management system prepares the power management system to anticipate a second change of state.

In another aspect of the present invention, an object of the present invention is to provide a power management system adapted for connection to a power source and an electromagnetic device where the power management system receives a control signal from a switch requesting a change in state of the electromagnetic device and wherein the power management system emits a first audible signal in response to the control signal.

Another object of the present invention is to provide a power management system where the power management system includes an electromagnetic device having a first state and a second state where the electromagnetic device has a first state being an applied state and a second state being a release state; the power management system emitting a second audible signal when the state of the electromagnetic device is changed from the first state to the second state and the power management system emitting a third audible signal when the state of the electromagnetic device is changed from the second state to the first state.

In another aspect of the present invention, an object of the present invention is to provide a power management system adapted for connection to a power source and an electromagnetic device where: a first control system receives a first control signal, and based on the control signal, sends electrical energy to an electromagnetic device; a second back-up control system, upon sensing a failure of the first control system, sends electrical energy to the electromagnetic device; and a manual override control system receiving a signal from a manual override enable switch, the manual override control system receiving a second control signal and based on the second control signal, sending electrical energy to the electromagnetic device.

Another object of the present invention is to provide a power management system where the first operating system and the second operating system operate independently from one another.

Another object of the present invention is to provide a power management system where the first operating system and the second operating system operate simultaneously.

Another object of the present invention is to provide a power management system where the failure of the first operating system is set as the default condition and if the default condition is met, the second operating system sends the electrical energy to the electromagnetic device.

In another aspect of the present invention, an object of the present invention is to provide a power management system adapted for connection to a power source and an electromagnetic device where: the power management system determines that the electromagnetic device is in a first state and that the electromagnetic device has become unseated; and upon determining that the electromagnetic device has become unseated, the power management system resets the electromagnetic device to the first state.

Another object of the present invention is to provide a power management system where the electromagnetic device produces a magnetic field, and wherein the power management system detects a current produced by the magnetic field to determine if the electromagnetic device has become unseated.

In another aspect of the invention, an object of the present invention is to provide a braking system for use in a vehicle comprising: an initiator for sending a control signal; a power management system, adapted for connection to a power source and a force generating system wherein the power management system controls energy delivered to the force generating system from the power source; a force transfer system connected to the force generating system, the force transfer system adapted to transfer force from the force generating system to a brake; where the braking system performs at least one diagnostic check.

Another object of the present invention is to provide a braking system for use in a vehicle comprising: an initiator for sending a control signal; a power management system, adapted for connection to a power source and a force generating system wherein the power management system controls energy delivered to the force generating system from the power source; a force transfer system connected to the force generating system, the force transfer system adapted to transfer force from the force generating system to a brake; where the braking system monitors at least one fault condition.

Additional features and advantages of the invention will be set forth in the description which follows, and in part will be apparent from the description, or may be learned by practicing the invention. The objectives and other advantages of the invention will be realized and attained by the structure particularly pointed out in the written description and claims as well as the appended drawings.

DETAILED DESCRIPTION OF THE INVENTION

Figure 5:
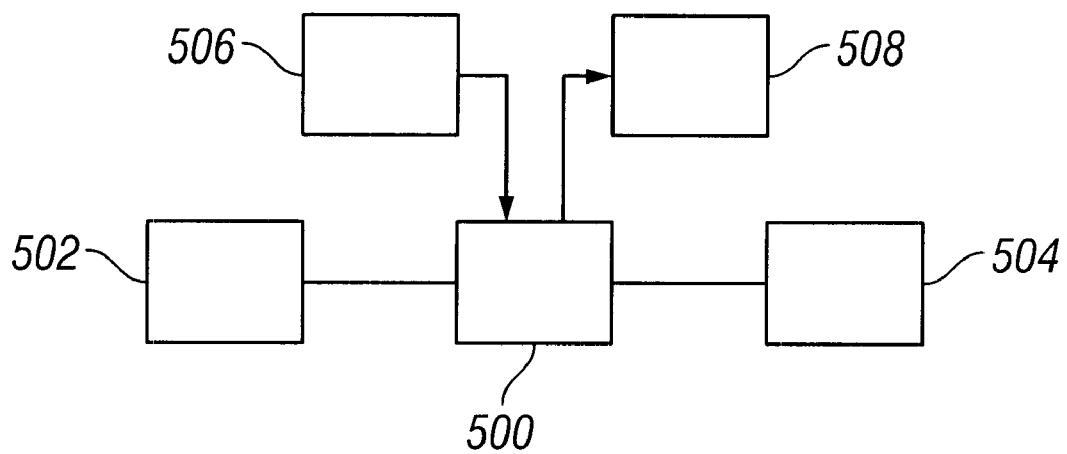
FIG. 5 is a schematic according to a preferred embodiment of the present invention.

Referring to FIG. 5, the present invention includes a system 500 that operates an electromagnetic device 504 by controlling the electrical energy sent to the electromagnetic device 504 from a power supply 502. The system 500 is also referred to as a power management system. The system 500, among other features, includes provisions that monitor the performance of the device, constantly diagnose the device for possible failures or problems, confirm successful operation of the electromagnetic device, receive control signals from users, provide feedback to users, is fault tolerant and includes multiple back-up systems. To perform these, and other functions, the system 500 communicates with various inputs 506 and includes various outputs 508.

While the invention can be applied to the control and operation of any electromagnetic device, the present disclosure will be limited to a particular example or application of the present invention for purposes of clarity.

A preferred embodiment of the invention includes either an electric motor mechanism or a magnetic latching mechanism suitable for use with a vehicle brake, more particularly, a vehicle parking brake.

The preferred embodiment provides a novel arrangement and use of circuit elements to perform the complex task of operating a magnetic latching mechanism in a safety related application, such as a parking brake system. The preferred embodiment includes the use of a microcontroller based electronic design that contains a secondary operating system, and a manual over-ride system. In combination with the primary operating system, these secondary and manual over-ride systems provide an aerospace design level of reliability for the preferred system. In addition, reliability is further assured, in the preferred embodiment, by the use of a parking brake unsafe indicator on the dash and other components to provide the user with assurance of proper operation and other information about the system's functions, including indications of transitions of the electromagnetic device.

The preferred embodiment, which can be referred to as a "Latch-Up Detector and Electrical Driver for Magnetically Biased/Latched Mechanisms and the Like" or alternatively as a "Latch-Up Detector/Driver," relates to the operation of bi-stable and mono-stable magnetic latching mechanisms in safety related applications, such as automotive parking brake systems such as described in U.S. Pat. No. 5,443,132 to Arnold; entitled: "Magnetic Latch Mechanism And Method Particularly For Brakes;" issued Aug. 22, 1995, which is incorporated by reference, herein. The preferred embodiment is also useful as a control mechanism for the power industry, including both nuclear and conventional, that utilize permanent magnetic latching devices in control and safety systems. The preferred embodiment is also applicable where correct operation of a magnetic latching mechanism is critical or otherwise crucial to operation of a more complex mechanism.

Preferably, embodiments of the present invention include electrical and electronic control circuitry and other elements that drive and operate mono-stable and bi-stable brakes, clutches, and valves of spring applied, magnetically applied, or magnetic activators in both full electronic drive modes and manual electrical modes. Preferably, the manual modes use only discrete components and do not use any advanced electronics for operation.

Figure 6:
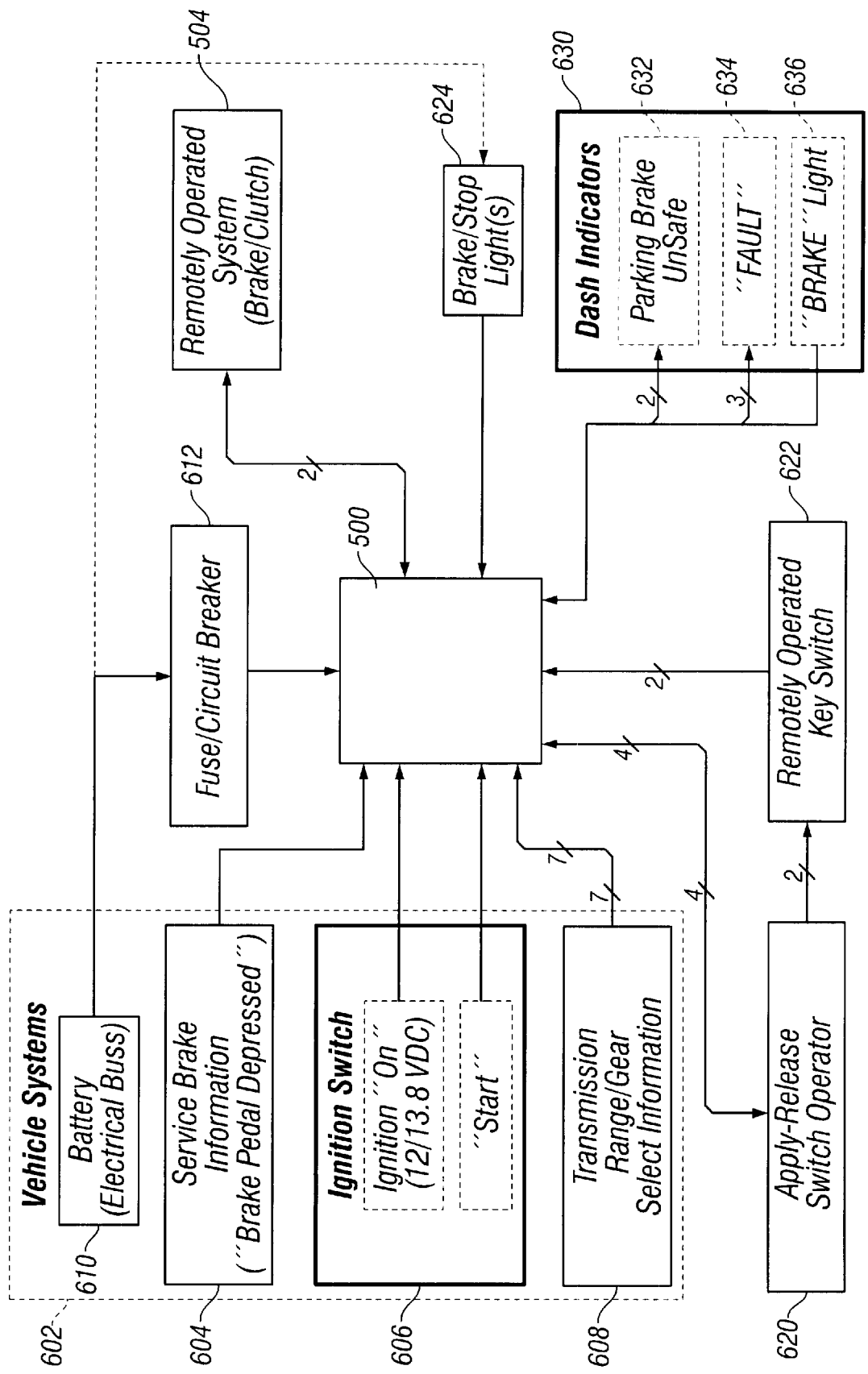
FIG. 6 is a schematic according to a preferred embodiment of the present invention.

FIG. 6 is more detailed schematic of the preferred embodiment of the invention. FIG. 6 shows some of the components that communicate with the system 500. Preferably, certain vehicle systems 602 communicate with the system 500. A service brake information module 604, which provides information on the condition of a brake pedal, including a brake pedal depressed condition, communicates with the system 500. An ignition switch 606, and transmission module 608 also provide information to the system 500. A battery 610 provides power to the system 500 through a protection device 612, which is preferably a fuse or a circuit breaker.

The system 500 communicates with an apply-release switch 620 and a remotely operated key switch 622. The system 500 receives control information from these two sources.

In addition to a conventional brake light 624, the system 500, also communicates with several dash indicators 630. The dash indicators 630 include a parking brake unsafe indicator 632, a fault indicator 634, and a brake light 636. The system 500 sends feed back information related to the function and integrity of the system and other components to the dash indicators 630.

The electromagnetic device 504 controlled by the system 500 is either a parking brake actuated by an electric motor or a magnetically latching parking brake. The preferred electric motor actuated parking brake is disclosed in U.S. Pat. No. 5,004,077, to Carlson et al., which is incorporated by reference herein. The preferred magnetically latching parking brake is disclosed in U.S. Pat. No. 5,443,132, to Arnold, which is incorporated by reference herein.

In an embodiment of the present invention, these mechanisms are operable in full automatic operating mode with no user initiation required (computer controlled), in semi-automatic operating mode with only some user initiation required (partial computer controlled), or in a full manual operating mode, which requires full user initiated operation (user/operator control).

The Latch-Up Detector/Driver electronics include the following: 1) an operating algorithm that increases the operational effectiveness of magnetic latching devices; 2) cost efficient electrical drive circuitry that provides a bi-polar pulse to efficiently operate pulse operated magnetic devices; 3) electronic circuitry to detect latch-up that occurs when the ElectroMagnetic Assembly (ENIA) within the driven mechanism changes state (changes from one position to another); 4) internal monitoring circuits that inform the operator or other user of the operating status of both the electronics and external driven mechanism; 5) an isolation resistance monitor to check the isolation resistance between the electrical winding of the electromagnets and the magnetic pole structure on which the electromagnets are wound; 6) performance monitors that monitor the time required for the magnetic assembly to change state; 7) position determining circuitry that determines the physical position of the driven mechanism; 8) an unscheduled event detector to monitor the EMA for a change in position created by such events as vibration or shock to the driven element; 9) Unswitched, Switched, and Enabled power supplies that provide the necessary power to operate the various analog and digital components contained within the mechanism; and 10) voltage monitors that provide an indication of an out of tolerance voltage condition.

The following features are included in an embodiment of the present invention An Analog-to-Digital Converter (ADC) is used as a diagnostic tool in determining the operating condition of both the electronics and the external remotely operated magnetic latching mechanism. An Apply-Release Switch Operator provides introduction of the initiate fault circuitry and residual switch position memory. An Audio Enunciator is provided, which includes use of a single microcontroller 1/0 port to control the operation of an audio warning device and the ability to have two intensity levels from the single information channel. A Bi-Polar Pulse Driver is used for a 'hybrid' electrical drive using a combination of mechanical relays and solid state switches to control the operation of a bi-directional device by including the capability to generate a bi-polar signal. Also included with the Bi-Polar Pulse Driver is the use of a tapped, or split, current sensing resistor to provide a differential current flow indication. A Brake/Clutch Position Sensor using a Direct Current Pulse electrically determines the position of an armature in a bi-stable magnetic latching device. The invention also includes a Brake/Clutch Status Indicator containing the 'Parking Brake UnSafe' logic unit and indicator. The bi-polar light emitting diode (LED) driver provides individual current limiting resistors for each color of the bi-colored LED's, allowing the driving circuit to be optimized for each color, and the Electronics Control Unit (ECU) includes use of the multiplexed and microcontroller tri-state output to increase the effective number of 1/0 ports available.

An embodiment of the present invention further includes a Fault Monitor for the use of a differential signal pair to set and reset a latching relay and control the illumination of an indicator. This feature also includes use of a circuit to record and use the residual fault indication produced by the last displayed fault indication. An operating algorithm that calculates the operating temperature of the EMA and that uses the results to control the amount of time allowed between engagements is also included with the Fault Monitor. This operating algorithm prevents heat build-up from damaging the magnetic assembly. An Isolation Resistance Monitor is provided for the use and operation of an in-line and on-line isolation resistance monitor to determine the operational status of an external electrical assembly. A Latch-Up Detector is used that includes a combination of gated differential amplifiers, shunted peak detectors, inverters, and differentials to produce a bi-polar latch-up detector.

An embodiment of the present invention also uses a synthetic signal to check the operation of the latch-up detector and includes integration of a Manual Over-Ride system into a pure electronic design. The Manual Over-Ride System uses the combination of mechanical and electronic systems to provide enhanced operational areas (including an unscheduled event detector).

An embodiment of the present invention further includes an Over Voltage Detector and a Position Memory that uses a microcontroller signal pair as a sensor and a control element for sensing the change in status. The Position Memory allows use of an over-ride setting, and control of the illumination of an indicator by using the same pair of signal lines. An embodiment of the present invention further includes a Service Brake Interface, which allows a parking-brake-by-wire design, and a Transmission Interface that allows use of the transmission range select information in the operating program of a parking-brake-by-wire system. The present invention also includes a Power Supply, a Reference Voltage Generator, an Under Voltage Detector, a Voltage Monitor, and a Serial Number, Electronic. Other features of an embodiment of the present invention include an UnScheduled Event Detector that is able to detect the unscheduled event, and that allows the unpowered changing of the latch state of a bi/mono stable magnetic device and resetting the device back to its original state. A Wave Form Generator is provided for checking the operation of the latch-up detector/driver circuitry with the use of a synthetic signal.

A functional overview of the components of an embodiment of the present invention are included in the Appendix and attachments to this application.

An embodiment of the present invention thus uses a cost effective combination of solid-state and mechanical components and relays to form a hybrid electrical drive unit that generates a bi-polar electrical pulse in a cost effective manner. Electronic circuits monitor the operating current to detect the 'dip' caused by the 'armature' changing from one state to the other state, providing an indication of latch-up. Electrical circuits determine the position of the magnetic assembly, armature, within the magnetic latching mechanisms, and monitor voltage and current levels to provide the user with an indication of the operating condition of both the electronics and magnetic latching mechanisms. A separate electrical circuit provides a manual mode for operation of the magnetic latching mechanism.

An embodiment of the Latch-Up Detector/Driver includes a Bi-Polar Pulse Driver, which provides a short duration pulse of bi-polar (+/− or −/+) power to an external, remotely located, electromagnetic device. The bi-polar pulse driver uses a combination of mechanical relays and solid state switches to form an arrangement for a Hybrid Electrical Drive.

In an embodiment of the present invention, the Bi-Polar Pulse Driver provides analog inputs to other sub-systems of the system, including the Latch-Up Detectors, UnScheduled Event Detectors, and Isolation Resistance Monitors. The Bi-Polar Pulse Driver also provides digital synchronization signals for the gated differential amplifiers within the Latch-Up Detectors, Position Sensors, and Latch-Up Detectors themselves.

In an embodiment of the present invention, the Latch-Up Detector consists of a peak detector, voltage divider, and voltage comparator. Although information on peak detectors, voltage dividers, and voltage comparators is generally known, the arrangement of these command functional elements to form a latch-up detector are a new and novel aspect of the present invention.

In an embodiment of the present invention, the UnScheduled Event Detector uses bi-pass resistors, clippers, and differential amplifiers. Each of these elements are common electrical circuits referenced or otherwise cited in data books for analog devices. However, the combination of bi-pass resistors, clippers, and differential amplifiers integrated with the Hybrid Electrical Drive and the concept of an UnScheduled Event Detector used in accordance with an embodiment of the present invention is new and novel.

Further, the Hybrid Electrical Drive of an embodiment of the present invention is a fault tolerate design, requiring a minimum of two failures to disable the driver. In order to enable the external brake/clutch, the primary control circuit must have two enable signals to function properly. A direction control signal is required to enable one relay, and a master control signal is required to enable the master switch. A malfunction in the directional control circuitry does not cause activation of the external brake/clutch, but does affect operation of the unit. A malfunction in the master control does not cause activation or cause non-operation of the unit, but does ultimately affect optimal life expectancy of the electronics. This arrangement of direction control and master control provides added operational safety and eliminates inadvertent operation due to impact initiation of an operation cycle.

The Position Sensor of an embodiment of the present invention determines the slope of a charging pulse and the amount of time it takes the charging current to pass through two reference points on the charging curve prior to switchover of the magnetic assembly in order to determine the position of the magnetic assembly in a direct current device. This is uniquely accomplished with a short duration pulse that does not change the position of the magnetic assembly in which the position is determined.

The Isolation Resistance Monitor of an embodiment of the present invention is a high gain differential amplifier that amplifies the leakage current through a by-pass resistor in the 'Hybrid Electrical Drive' when both directional control relays are engaged at the same time, without engaging the solid state switch isolating the return path of the magnetic latching assembly within the magnetic latching mechanism.

In an embodiment of the present invention, the Manual Over-Ride Circuitry provides a totally independent and redundant method of operating the external or otherwise remotely operated magnetic latching mechanism. This circuit addresses concerns about total or partial electronics failure and allows the user, such as a vehicle operator, to manually operate a driver in order to control the operation of the external or remotely operated magnetic latching device.

The software algorithms of an embodiment of the present invention take advantage of the unique characteristic of the hardware to provide a fault tolerant operating system that provides maximum opportunity for the safety related hardware to function. The algorithms are structured in such a manner to allow the external or remotely operated magnetic latching device to operate regardless of fault indications (i.e., if a non-critical fault develops, the system does not shut down).

Figure 1:
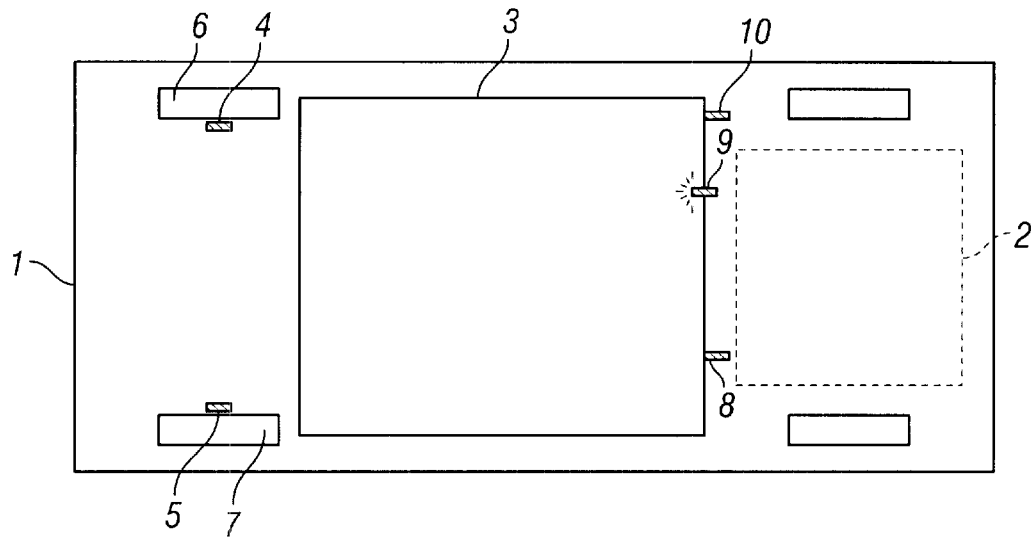
FIG. 1 shows an overhead view of a vehicle, presenting the location of various components of the system according to an embodiment of the present invention.

FIG. 1 shows an overhead view of a vehicle, such as an automobile, presenting the location of various components of the system according to an embodiment of the present invention. As shown in FIG. 1, the vehicle 1, has a hood 2 and a passenger compartment 3. Various components of an embodiment of the present invention as illustrated in FIG. 1 include the magnetic latching devices 4, 5 located in this embodiment at the rear wheels 6, 7 of the vehicle 1; a system disabling switch 8, located, for example within the glove compartment (not shown in FIG. 1) of the vehicle 1; a dash indicator light 9; and an apply-release switch 10.

Figure 1A:
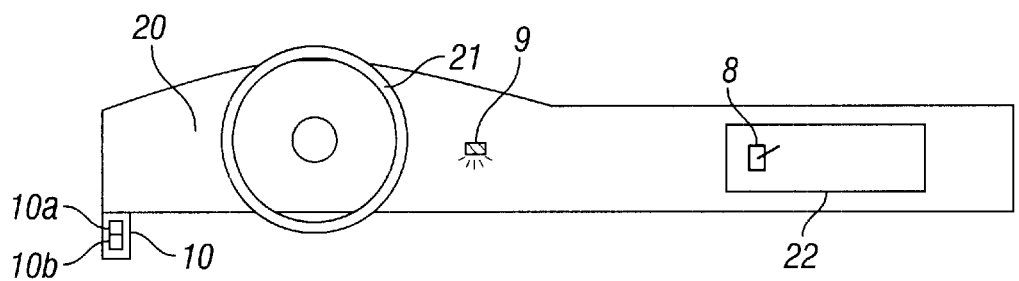
FIG. 1A shows a close-up of a vehicle dashboard, showing the location of various dashboard components of the system according to an embodiment of the present invention.

FIG. 1A shows a close-up, of a vehicle dashboard, showing the location of various dashboard components of the system according to an embodiment of the resent invention. FIG. 1A presents an example vehicle dashboard 20, and a steering wheel 21 and glove compartment 22. Illustrated are the manual override enabling switch 8, located within the glove compartment 22; the indicator light 9; and the apply-release switch 10, having an apply position 10a and a release position 10b.

In order to better describe the present invention, as described in the figures below, the following drawing and text convention are used for referencing a single connector, single signal, as being a conductor and a buss as being multiple signals (i.e., two or more). Arrows indicate the directional flow of the signal, with a single arrow indicating flow in only one direction. Double arrows indicate a bi-directional signal flow or the opposing signal flow of two different signal. Multiple signal lines between the same functional elements indicate signal grouping and are used to explain the operation and function between signals sets. The Latch-Up Detector/Driver according to an embodiment of the present invention was initially divided into 22 functional elements. This division into functional elements greatly aids in the explanation of the circuits and helps to establish an easily understandable drawing convention. The functional elements follow the natural division between functional groups (they follow logical division lines). The following functions were combined in the OverAll Block Diagram of FIG. 2 in order to simplify the diagram: 1) Brake/Clutch Position Indicator & Position Memory form the EMA Position Indicator; 2) Over-Voltage Detector, Under Voltage Detector, & Voltage Monitor form the Power Monitor; 3) Reference Voltage Generator is combined into the Power Supply; and 4) Service Brake Interface & Transmission Interface form the Vehicle Interface unit. This approach thus combined nine smaller functions into four more complex, but logical, functions and resulted in 17 functional sections on the OverAll Block Diagram. (See FIG. 2.)

In an embodiment of the present invention for an example vehicle application, the Latch-Up Detector/Driver interfaces with the following vehicle systems (shown by shadowed boxes on the OverAll Block Diagram of FIG. 2): 1) vehicle battery; 2) vehicle systems; 3) ignition switch; 4) external remotely operated magnetic latching mechanism; 5) in-dash "brake" indicator (current indicator on vehicle's instrument cluster); 6) parking brake unsafe indicator (current indicator on vehicle's instrument cluster); and 7) fault monitor indicator (current indicator on vehicle's instrument cluster).

In an embodiment of the present invention, electrical power is taken from the vehicle's Battery Buss to provide power to the External Remotely Operated Magnetic Latching Mechanism through the Isolation Resistance Monitor, Bi-Polar Pulse Driver, and Manual Over-Ride systems when operating in the full electronic mode. A secondary power system also provides power to the External Remotely Operated Magnetic Latching Device (Brake) through the Manual Over-Ride system when the Brake is operated in manual mode. The vehicle Battery Buss also provides power to the Power Supply and Fault Monitor systems.

Figure 2:
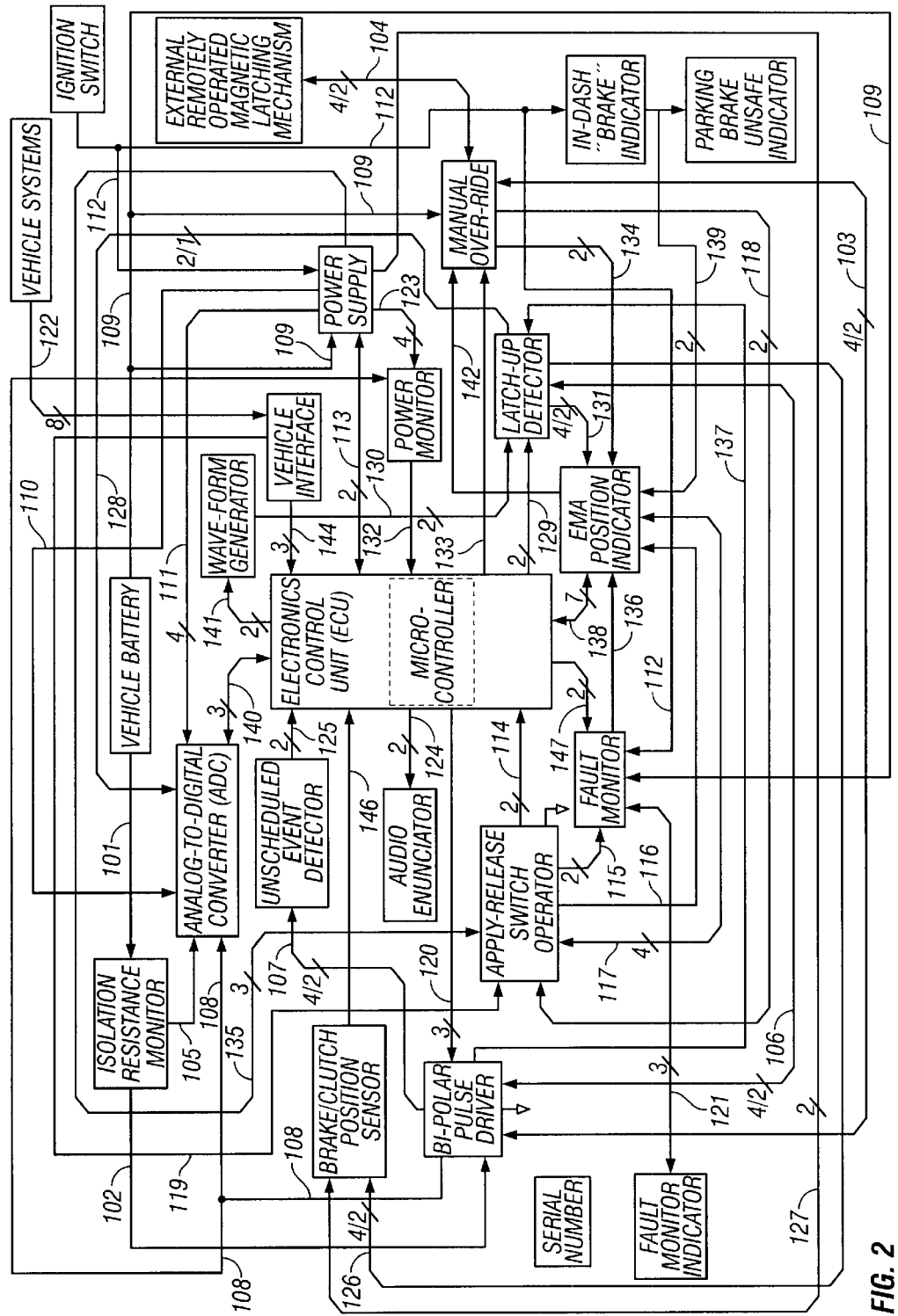
FIG. 2 depicts a block diagram of the electronic and other elements of the latch-up detector and electrical driver for magnetically biased/latched mechanisms and the like according to an embodiment of the present invention.
Figure 7:
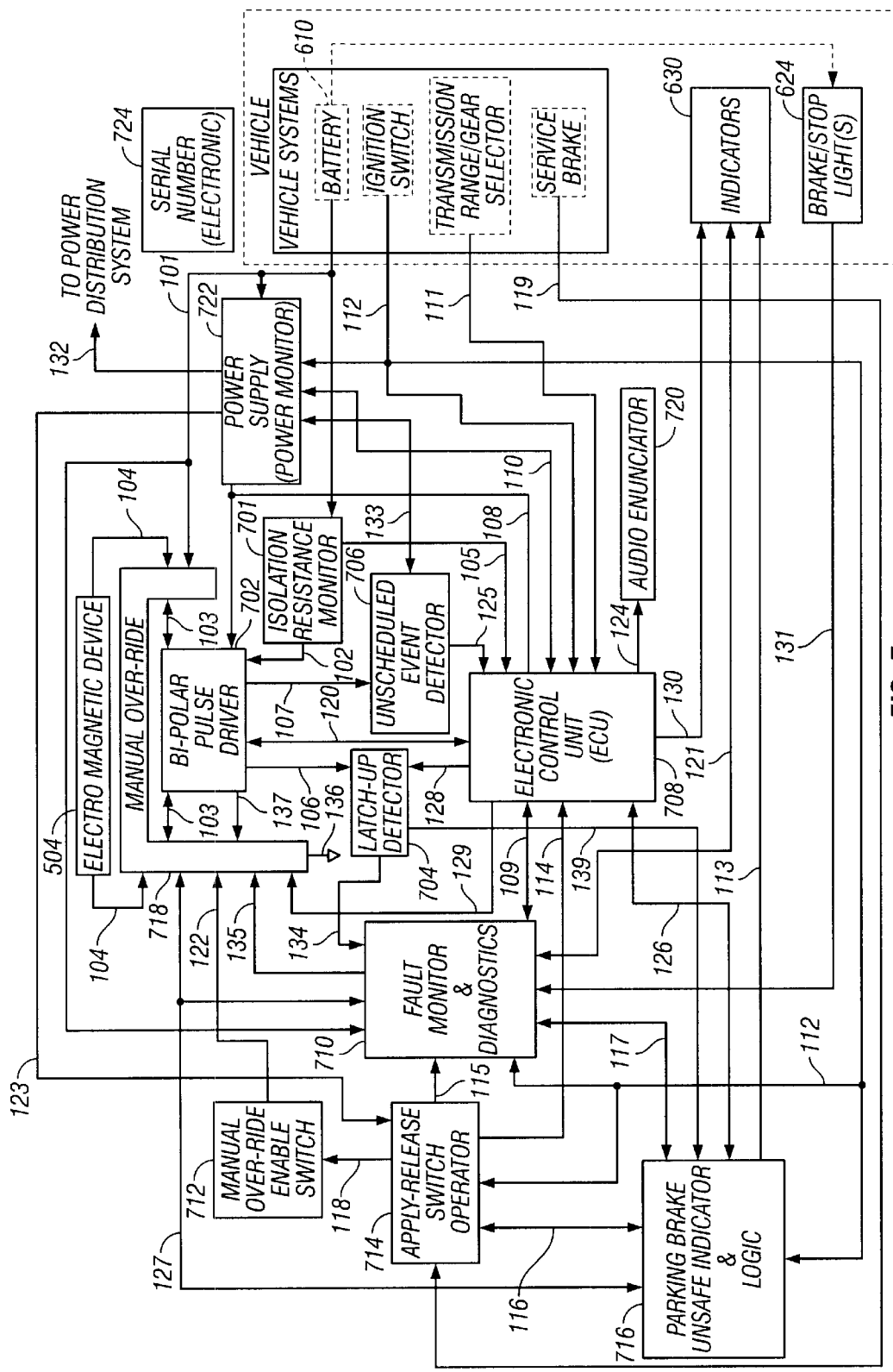
FIG. 7 is a block diagram according to a preferred embodiment of the present invention.

A preferred embodiment of the present invention, as shown in FIGS. 2 and 7., a vehicle's battery 610 supplies electrical power to an Isolation Resistance Monitor 701 via connector 101. The Isolation Resistance Monitor 701 monitors the condition of the electrical insulation between the electromagnet windings and the magnetic pole structure of the EMA within the electromagnetic device 504 to provide an indication of the operating condition of that device.

The Isolation Resistance Monitor 701 can measure any suitable characteristic of the electromagnetic device 504. Preferably, current flow, current leakage, of the electromagnetic device 504, as part of the operational diagnostics is monitored by the Isolation Resistance Monitor 701. The current flow and/or current leakage provides a voltage reading to an analog to digital converter (ADC) preferably located within the electronic control unit via bus 105. A voltage reading indicates that the isolation resistance between the electrical conducting elements of the electromagnetic device 504 and the magnetic pole structure upon which the electromagnets are wound is not performing as expected. In other words, the Isolation Resistance Monitor 701 provides information regarding the condition of the electrical insulation between the electromagnet winding in the electromagnetic assembly (EMA) and the pole structure to the ADC by a conductor 105.

Preferably, the Isolation Resistance Monitor 701 is in series with the battery 610 for the Bi-Polar Pulse Driver 702 and the Isolation Resistance Monitor 701 is connected to the Bi-Polar Pulse Driver by a conductor 102 (see FIG. 2).

Preferably the Isolation Resistance Monitor 701 includes a limited high ratio current sensor in series with an automatic resetting circuit breaker, which provide an indication of current flow and/or leakage current, in the range of 0.0 to 0.3 volts. The output from this current sensor is sent to a high gain differential amplifier within the Isolation Resistance Monitor 701.

The automatic resetting circuit breaker located within the Isolation Resistance Monitor 701 provides protection of the vehicle's electrical system from damage that might be caused by the electromagnetic device 504. The automatic resetting feature of the circuit breaker allows electromagnetic device 504 to apply or attempt to apply, even if shorted and drawing excessive operating current causing the circuit breaker to trip and then reset.

In the preferred embodiment, a high gain differential amplifier provides an input into the ADC for use in the calculation of the isolation resistance of the insulation between the electromagnetic winding and the ferromagnetic pole structure of the EMA within the electromagnetic device 504. Although the Isolation Resistance Monitor 701 is on-line when the Latch-Up Detector/Driver 704 is operating the electromagnetic device 504, preferably, the information is only used during power-up diagnostics.

Failure or an open condition of the circuit breaker is detected by the Isolation Resistance Monitor 701. The calculation of the isolation resistance is accomplished by polling the Isolation Resistance Monitor via the ADC, with the directional control relays de-energized, to determine the offset reading of the amplifier, then energizing both directional control relays to measure the amplified current flow through the sensor and subtracting the offset voltage of the amplifier.

As shown in FIG. 2, in an embodiment of the present invention, three control signals to operate the ADC are provided by the microcontroller within the ECU via an internal buss within the Electronics Control Unit between the microcontroller and the ADC. The ADC is an 8-Bit Serial Analog-to-Digital Converter Chip with an on-chip 8-Channel Multiplexer allowing the measurement of eight different voltage levels. The information processed by the ADC is used in the diagnostic programs to determine the operating condition of the EMA within the electromagnetic device, as follows: 1) to process information provided by the current sensing elements within the Bi-Polar Pulse Driver, 2) to determine if the operating voltage is sufficient to operate the external remotely operated magnetic latching mechanism; 3) to determine if the operating voltage is excessive and would damage the EMA of the electromagnetic device if operated at that voltage level, and 4) provide measured voltage levels for use by an on-line voltage monitor during operation of the electromagnetic device.

Voltage monitoring by the ADC, in an embodiment of the present invention, is performed during power-up diagnostics or as a result of a residual operating fault causing the diagnostics to be run as part of a pre-operational cycle. Voltages monitored by the Power Monitor during operation of the Latch-Up Detector/Driver generate a microcontroller interrupt if they reach out-of-tolerance levels.

The Bi-Polar Pulse Driver provides signal sets, buss 103, for each operating Channel of the Latch-Up Detector/Driver to the Manual Over-Ride system in an embodiment of the present invention. The Bi-Polar Pulse Driver is capable of providing short duration pulses of bi-polar (+/− or −/+) power to the electromagnetic device via the Manual Over-Ride. The Bi-Polar Pulse Driver contains additional electronics that sense operating currents of the EMA within electromagnetic device, and provides an analog indication of current requirements to other functional elements of the electronics, the Latch-Up Detectors, and Unscheduled Event Detectors. Ground return path for electrical power to operate the electromagnetic device via the Bi-Polar Pulse Driver is provided by conductor 137 through the Manual-Over-Ride system. The ground return path for the Manual Over-Ride system is provided by conductor 136. Buss 108 provides operating voltage information from the Bi-Polar Pulse Driver to the Power Monitor within the Power Supply, and a signal to create a microcontroller interrupt in the microcontroller within the ECU.

In an embodiment of the present invention, the Bi-Polar Pulse Driver receives three control signals for the ECU by buss 120, as shown in FIG. 2. These three signals are used to control a pair of directional control relays and the operation of a solid state master switch. These directional control relays are in an H-Bridge configuration, which only requires one relay to be energized to connect the electromagnetic device to a power source while the master switch means, MOSFET, provides a return circuit path for the current flow. A relay is energized to indicate the direction/operation to be performed. Once the relay contact's close and stops bouncing (typically 10 to 15 mSec after contact closure), the MOSFET is energized to allow current flow through the electromagnetic device.

The solid state master switch means, a MOSFET, according to an embodiment of the present invention, is placed in the electrical return path of the H-Bridge and operates in conjunction with a split or center tapped current sensing resistor. The addition of the MOSFET allows the drive the capability of pulse width modulation, allowing infinite control of the power to the driven elements of the EMA within the electromagnetic device Energizing both directional control relays connects both leads of the EMA within the electromagnetic device to battery power, isolating it from the ground return path. The center tapped or split current sensing resistor provides bi-polar signal information to the Latch-Up Detector system through buss 106. Each end of the current sensing resistor connects to a directional control relay with the center tapped portion connecting to the solid state master control. Although the signal rises above ground by the IR value—the On resistance of the solid state master switch, the differential amplifier eliminates this offset voltage for its output, providing a bi-polar representation of the operating current flowing through the electromagnetic device.

An embodiment of the present invention includes blocking diodes added to isolate the directional control elements from the current path when in their unenergized state, allowing the Unscheduled Event Detector to function. This isolated form of the signal is provided to the Unscheduled Event Detector through buss 107, as shown in FIG. 2. An operating voltage level signal is provided to the ADC within the Electronics Control Unit by the output of the Unscheduled Event Detector by buss 125. The Power Supply provides operating power for the Unscheduled Event Detector by conductor 133 during the time the vehicle's ignition switch is On.

The Unscheduled Event Detector is active any time the vehicle's ignition switch is On in an embodiment of the present invention. The Unscheduled Event Detector includes a moderate gain differential amplifier and voltage level detectors. The level detectors are set to sense voltages on either side of the mid-range reference voltage. The differential amplifiers contain a buffer amplifier section that uses 'notch' filters to remove any stray 60 Hz signals picked up by the EMA within electromagnetic device. The Unscheduled Event Detector monitors a closed electrical circuit of the electromagnets within the EMA of the electromagnetic device for a pulse generated by the EMA changing position due to such events as vibration or 'shock' without any application of power. When the EMA becomes unlatched, the magnetic field expands, changes, creating an electrical pulse which is detected by the Unscheduled Event Detector. The Unscheduled Event Detector receives a modified bi-polar monitoring signal from the Bi-Polar Pulse Driver by buss 107 for each operating channel of the Latch-Up Detector/Driver.

Figure 3B:
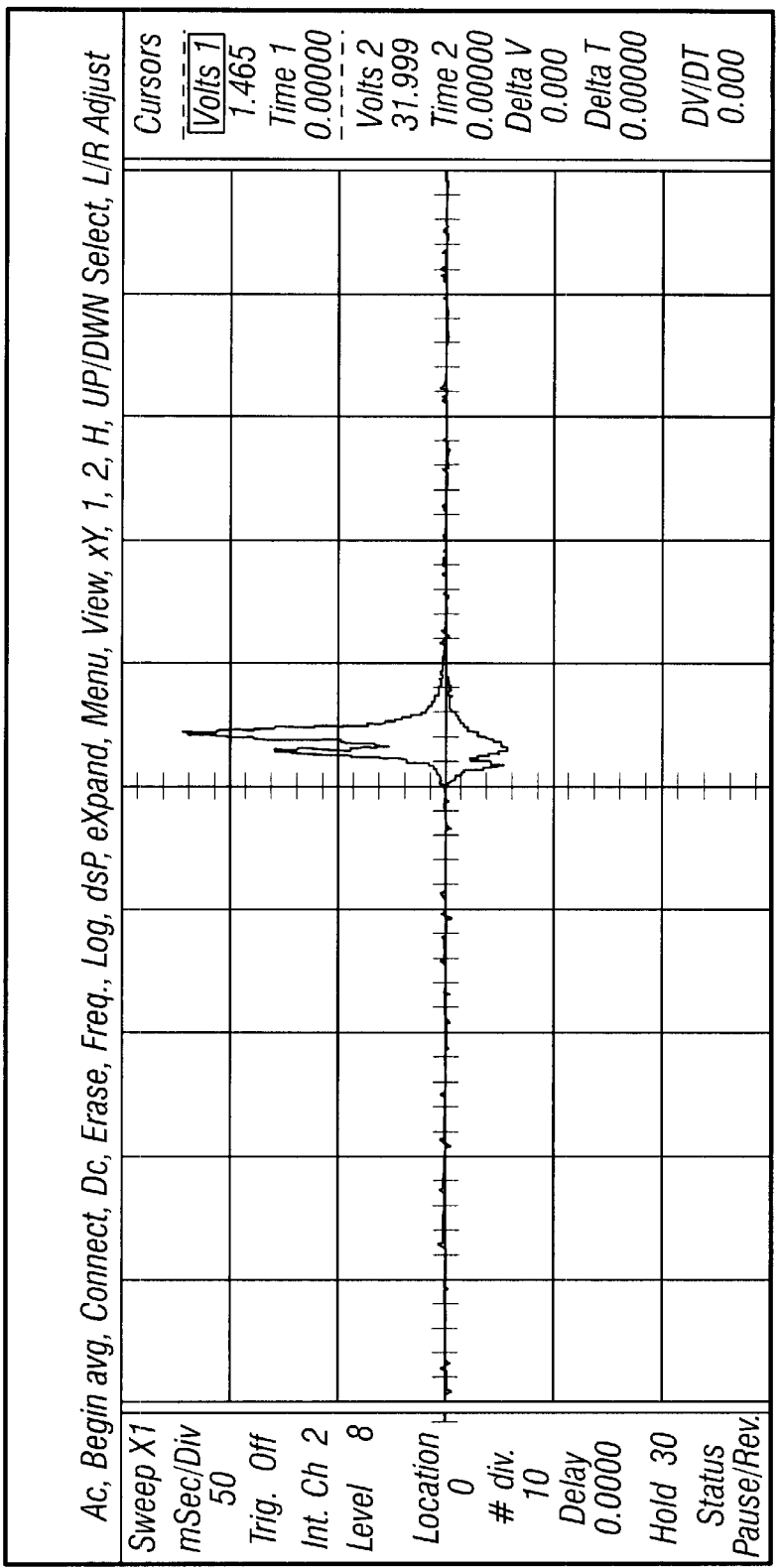
FIG. 3 presents an oscilloscope trace of a pulse produced by an unscheduled event of the magnetic latching device of an embodiment of the present invention.

In the event of an unscheduled change in the magnetically latched state of the EMA, in an embodiment of the present invention, the resulting pulse is amplified and detected by the Unscheduled Event Detector and sent to the microcontroller within the ECU by buss 125. (FIG. 3 presents an oscilloscope trace of an example pulse produced by an unscheduled event of the magnetic latching device of an embodiment of the present invention.) In the event of an 'impact' occurring that causes the EMA within the electromagnetic device to go from released to applied, the Unscheduled Event Detector and associated electronics is able to reset the magnetic assembly to the correct position before the electromagnetic device is able to engage. For the fastest response to a release command, in an embodiment of the present invention, the electronics uses a combination of microcontroller initiated Manual Over-Ride, Release cycle, and electronic operation of the master switch. This is accomplished without having to enable the power supply to provide operating current for energizing the directional control relay. This fast response procedure allows the microcontroller to engage the manual release directional control relay, bring up the power supply, and enable the master switch means before the steering diodes and capacitors can engage the return path relay.

Power from the vehicle Battery Buss to the Manual Over-Ride system is provided by conductor 101 in an embodiment of the present invention, which also provides battery power to the Power Supply for conversion to voltage usable by the electronic components, and to the Fault Monitor, by the same conductor 101. The Manual Over-Ride includes a series of relays that provide appropriate power and ground reference signals to the electromagnetic device, allowing manual operation of the electromagnetic device without the use of the electronics or any of the components associated with the electronic operation of the electromagnetic device. The Manual Over-Ride either provides operating power to electromagnetic device via buss 104, when the device is operated in the manual mode, or is transparent, allowing the Bi-Polar Pulse Driver to provide the operating power. The microcontroller within the ECU provides a signal pair to the Manual Over-Ride by conductor 129, which allows the microcontroller to initiate a manual apply and release cycle of the external remotely operated magnetic latching mechanism. The Manual Over-Ride system resets or sets the position memory of the EMA Position Indicator within the Parking Brake UnSafe Indicator & Logic module and provides a fault indication to the Fault Monitor & Diagnostics via buss 127 when activated.

The Power Supply conditions the incoming power in an embodiment of the present invention, converting the power to usable levels for the control circuits and digital and analog circuit components. A conditioned ignition signal is supplied to several functional elements for use in providing a secondary power source for critical functions in the event of a failure of the regulated supplies. The reference voltage generator within the Power Supply provides a reference voltage (2.56 volts) to the ADC within the Electronics Control Unit by buss 110, which is used as a reference in the analog-to-digital conversions of the ADC. The reference voltage generator also provides the reference voltages for the Brake/Clutch Position Sensor within the Parking Brake UnSafe Indicator & Logic via buss 138. The Power Supply also provides four voltages for the ADC to process into digital information by buss 110. These voltages are polled by the ADC to determine if the operating voltages produced by the power supply are correct and within the correct operating tolerance.

In an embodiment of the present invention, battery power supplied to the Fault Monitor, also by conductor 101, is used to provide a secondary backup power source for operating the initiate fault circuitry used to generate a fault upon activation of the apply or release operating switch. The Power Supply provides conditioned ignition power, enabled power, and switched power to the Apply-Release Switch Operator, allowing the switch operator toggle switch to function in the event of a failure of the regulated power via buss 123 and to provide operational interlocks for operating the electromagnetic device. UnSwitched electrical power from the Power Supply is provided to the Apply-Release Switch Operator via conductor 123 allowing the initiate of an operating cycle when the control system is in the 'stand-by' mode.

Power from the Ignition Switch is also provided to the Power Supply, Fault Monitor, ECU, Apply-Release Switch Operator, and Parking Brake UnSafe Indicator by conductor 112 in an embodiment of the present invention. When the Ignition Switch is turned on or the battery reconnected the microcontroller performs a self diagnostic to ensure that the power supplies are operating at the correct voltages and the position stored in the non-volatile memory position agrees with the position determined by the position detector, checks operations of the latch-up detector, checks isolation resistance of the EMA, turns off the Fault Monitor indicator if no faults are found, and then goes to 'sleep'. Cycling the ignition switch turn off the Fault Indicator saving battery power while cycling the ignition switch three time causes the Parking Brake UnSafe Indicator Logic to reset the electronics. The conditioned ignition signal provided to the ECU generates microcontroller interrupts which invoke corresponding operating program in response to the status of the ignition switch. The Fault Monitor & Diagnostics module contains logic that creates a ground return path for conductor 131 which turn's on the vehicle's Brake/Stop Lights when the electromagnetic device is applied and the vehicle is in a mode to generate powered movement.

According to an embodiment of the present invention, the Power Supply provides continuous UnSwitched Power, 5.0 VDC, to the microcontroller within the ECU and microprocessor supervisor located in the Power Supply. This UnSwitched power is used in a limited capacity to operate the Apply-Release Switch Operator and Fault Monitor. The microprocessor supervisor monitors the incoming power to the microcontroller along with input power to the Latch-Up Detector/Driver Electronics and produces a 'reset' if the power falls below a predetermined level. The supervisor also holds the reset low for a short period of time to allow the power to stabilize upon power-up. A manual reset button on the circuit board allows manual resetting of the microcontroller. The ECU generates a ground for operating the dash mounted "BRAKE" indicator light comparable to the function and operation of the 'brake' light of conventional systems.

The microcontroller within the ECU of an embodiment of the present invention provides two signals to the Power Supply, which is used to bring certain supplies up on-line when required, in order to reduce the power consumption by buss 110. When the operating program within the microcontroller needs to bring a system (function) on-line, the program first instructs the power supply to bring certain regulated supplies on-line to provide operating power for these functional elements.

The activation of the Switched 5.0 VDC is controlled by the microcontroller of an embodiment of the present invention. This power supply actually includes an 8-volt regulated supply and a 5-volt regulated supply. The 8-volt supply is used to power some of the analog devices and is a power source for the negative 5.0 volt supply. The negative 5.0 volts is produced by a DC-to-DC converter, charge pump, and a 5.0 volt negative regulator The negative 5.0 volts is used by the differential amplifier and multiplexer within the Latch-Up Detector element. The second power supply is controlled either by the microcontroller or by the Ignition Switch. Ignition voltage is conditioned and used to enable the enabled 5.0 VDC power supply, to provide an interrupt to the microcontroller, which signals that the Ignition Switch has been turned On, and as a power source for the operating program to perform its diagnostics routine. The enabled power supply produces enabled 5.0 VDC, which is used exclusively by the Unscheduled Event Detector and the release portion of the Apply-Release Switch Operator that form the ignition interlock. This allows the Unscheduled Event Detector to be active any time the Ignition Switch is On and enables the release function. Power to operate the logic and analog elements of the invention is provide by a power distribution system in the form of a buss 132.

The Power Monitor and ADC, in an embodiment of the present invention, receives a sample of operating power for the electromagnetic device from the Bi-Polar Pulse Driver when one of the directional control relay's is energized by buss 107. The power monitor checks the voltage levels to ensure that sufficient voltage is present to reliably operate the electromagnetic device and to ensure that the voltage is not excessive, which could damage the EMA within electromagnetic device.

The Power Monitor also receives four voltages from the power supply in an embodiment of the present invention, in order to monitor during operation to ensure that the operating voltage is correct by an internal buss between the power supply and Power Monitor. The Power Monitor compares the voltages to each other to ensure that the Power Supply voltages are correct during operation of the external remotely operated magnetic latching mechanism. An embodiment of the present invention includes use of a combination of measured and compared voltages to establish voltage relationship. If the operating voltages are not within the specified voltage range, the Power Monitor sends an interrupt signal to the microcontroller by buss 110.

In an embodiment of the present invention, when the microcontroller receives an interrupt as the result of a contact closure within the Apply-Release Switch Operator, the microcontroller 'wakes-up' and determines what interrupt was generated and what program section to run. The signal that generates the interrupt from the contact closure is sent to the microcontroller by buss 114. At the same time, the Apply-Release Switch Operator passes a signal to the Fault Monitor by the optical isolator coupling 115 to produce an initiate fault, and sends residual switch position information to the EMA Position Indicator within the Parking Brake UnSafe Indicator & Logic by buss 116. The initiate fault causes the Red portion of the Fault Monitor Indicator to illuminate. The illumination of the Fault Monitor Indicator is controlled by a bi-polar signal from the microcontroller via buss 109 or by the initiate fault.

The Fault Monitor sends power to operate the LED within the Fault Monitor Indicator and completes a return path by buss 121. The initiate fault is also sent to the EMA Position Indicator by conductor 117. The EMA Position indicator sends a drive signal to operate (illuminate) the switch illuminators in the switch operator of the Apply-Release Switch Operator by buss 116. A program algorithm is included in an embodiment of the present invention that estimates the operating temperature of the EMA by using the amount of current drawn during apply and the operating voltage to develop an approximate operating temperature of the unit.

As the operating temperature increases, in an embodiment of the present invention, the operating program extends the amount of time the operating indicators are illuminated and the amount of time the microcontroller remains active before going to 'sleep'. Once the program has indicated that the EMA has reached a 'mild' temperature, the operating program checks the position memory to determine if an operating cycle is necessary. If an operating cycle is not necessary, a longer audio warning is sounded and the system 'fakes' a cycle, which provides indication that a cycle has been performed but keeps the fault indicator illuminated longer, and indicates an intermittent fault until the system is allowed to cool down. In an embodiment of the present invention, the system also verifies that a change in status is necessary using information from the shifter position.

During manual over-ride operation and when enabling the key operated manual over-ride switch according to an embodiment of the present invention, the Manual Over-Ride circuitry relies on the Apply-Release Switch Operator to provide a ground return path for engaging the manual over-ride system by buss 118 and buss 122. The optional service brake interface interlock is performed by engaging the service brake, (part of the Vehicle Systems) allowing the active high signal from Vehicle Systems to be sent to the Vehicle Interface by buss 119. The Vehicle Interface conditions the active high signal to produce an active low signal, which is supplied to the Apply-Release Switch Operator by conductor 119. This active low signal is required to engage the release switch portion of the Apply-Release switch operator. Input jumpers at the circuit board connector allow for different interface options.

In an embodiment of the present invention, Vehicle System also provides transmission range select information to the Vehicle Interface by buss 111. The Vehicle Interface processes and conditions data from the transmission, or range selector indicator, providing the microcontroller with an indication of the status and operating mode of the transmission via buss 111. The Transmission Interface conditions the signal provided by the transmission, thereby in an embodiment of the present invention changing the 7-Line Decimal (1-of-7) active high (12/13.8 VDC) signal to a 3-Bit Binary Coded Digital (BCD) signal that is compatible with the 5-Volt TTL signal levels used by the Latch-Up Detector/ Driver Electronics. The translator, Transmission Interface, has a one digit offset (least significant bit equals "1") at the output, eliminating the condition of all 'zero's' for the least significant bit.

The operation of the Audio Enunciator is controlled by two signals from the microcontroller in an embodiment of the present invention. The signals make full use of the tri-state outputs of the microcontroller I/O ports. The microcontroller signals are sent to the Audio Enunciator by buss 124. The Audio Enunciator provides the user (e.g., driver) with an audio indication (warning) of an impending change of state (going from applied to released or going from released to applied) of the electromagnetic device or an indication of a fault condition. In the case of static operation, with the vehicle in 'Park' or 'Neutral', the Audio Enunciator sounds a short 'chirp'. While in the event of dynamic operation, with the vehicle in gear (moving), the Audio Enunciator sounds three short 'beeps' prior to the electromagnetic device applying, which allows time for the operator or other user to cancel the impending apply operation in the case of inadvertent application while the vehicle is moving. In an embodiment of the present invention, the Audio Enunciator generates dual tones, 2 KHz and 3.7 KHz, at two different sound intensity levels.

The Brake/Clutch Position Sensor within the Parking Brake UnSafe Indicator & Logic receives one or two channels of operating current or voltage information from the Latch-Up Detector by buss 126 in an embodiment of the present invention. The Power Supply provides two reference voltages via buss 112 for a window comparator within the Brake/Clutch Position Sensor to determine the slope of the charging current or voltage of a short operational pulse sent to the EMA within the electromagnetic device. The microcontroller receives a pulse from the Brake/Clutch Position Sensor within the Parking Brake UnSafe Indicator and Logic by conductor 126, which measures the amount of time the pulse is high. This information is compared to predetermined values to determine the latched condition of the EMA within the electromagnetic device.

In an embodiment of the present invention, as shown in FIG. 2, the Fault Monitor receives optically coupled information from the Apply-Release Switch Operator pertaining to an initiate cycle via optical buss within buss 115. This optically coupled signal produces an initiate fault in the Fault Monitor, which is then sent to the EMA Position Indicator within the Parking Brake UnSafe Indicator & Logic module by conductor 117. The initiate fault information is used by the parking brake unsafe logic array within the Parking Brake UnSafe Indicator & Logic to illuminate the Parking Brake UnSafe indicator and Fault Monitor Indicator located in the vehicle's dash by buss 113. The Parking Brake UnSafe Indicator & Logic contains parking brake unsafe logic, which detects an unsafe parking brake condition and illuminates the Parking Brake UnSafe Indicator via buss 113. The parking brake unsafe logic monitors the position memory elements for an unbalanced brake condition (e.g., one brake applied while another brake is released), residual switch position, and initiate fault for an unsafe condition. The EMA Position Indicator within the Parking Brake UnSafe Indicator & Logic module also contains a timer that is activated once there is an occurrence of a 'fresh' initiate fault that has not been cleared by the electronics, and activates a manual apply and release cycle of the manual over-ride via buss 127. The EMA Position Sensor also contains logic that operates the In-Dash "Parking" Indicator via buss 113. Activation of the Manual Over-Ride system send a fault signal to the Fault Monitor & Diagnostics module by conductor 135.

At the same time that the initiate fault is generated, in an embodiment of the present invention, the Apply-Release Switch Operator generates a microcontroller interrupt, and the microcontroller initiates the proper program segment relating to the interrupt. Once the operating program has completed its task, the microcontroller generates a signal pair, sending fault information to the Fault Monitor concerning the status of the diagnostics. If the diagnostic routine does not find any faults, the signal polarity on the signal sent to the Fault Monitor resets the residual fault memory to a no fault indication, which also resets the initiate fault. As long as the Fault Monitor receives a signal pair for the microcontroller of opposing polarity, the Fault Monitor provides drive for the bicolor LED's located in the off-board Fault Monitor indicator via buss 121.

When the microcontroller removes the bi-polar drive signals to the Fault Monitor in an embodiment of the present invention, the positional feedback bias network places positional information on the microcontroller buss. As part of the operational initiation, the operating program polls the Fault Monitor I/O buss to determine the residual fault information. If the residual fault information indicates program termination in a fault, the operating program runs diagnostics at the start of an initiate cycle to determine if the fault is still valid and if the fault will have an effect on the performance of the Latch-Up Detector/Driver.

The system utilizes both hardware and software faults. Initiate and fault monitor faults are produced by circuits external to the microcontroller. These fault conditions are retained in non-volatile memory elements or latching relays, where they are read by the microcontroller and used of set operating parameters of the operating system. Software faults produced by the system's diagnostics are retained within the microcontroller. The operating system, control system's program, initiates an operating program which is defaulted to an error condition which will set the indicators to show a faults condition. If the requested task, for example, an apply or release request, cycle is completed successfully, the operating program 'interrupts' the initiate program with a conformation routine which sets the indicators, fault and visual indicators, to a completed task indication and then turns off the indicators.

Figure 4B:
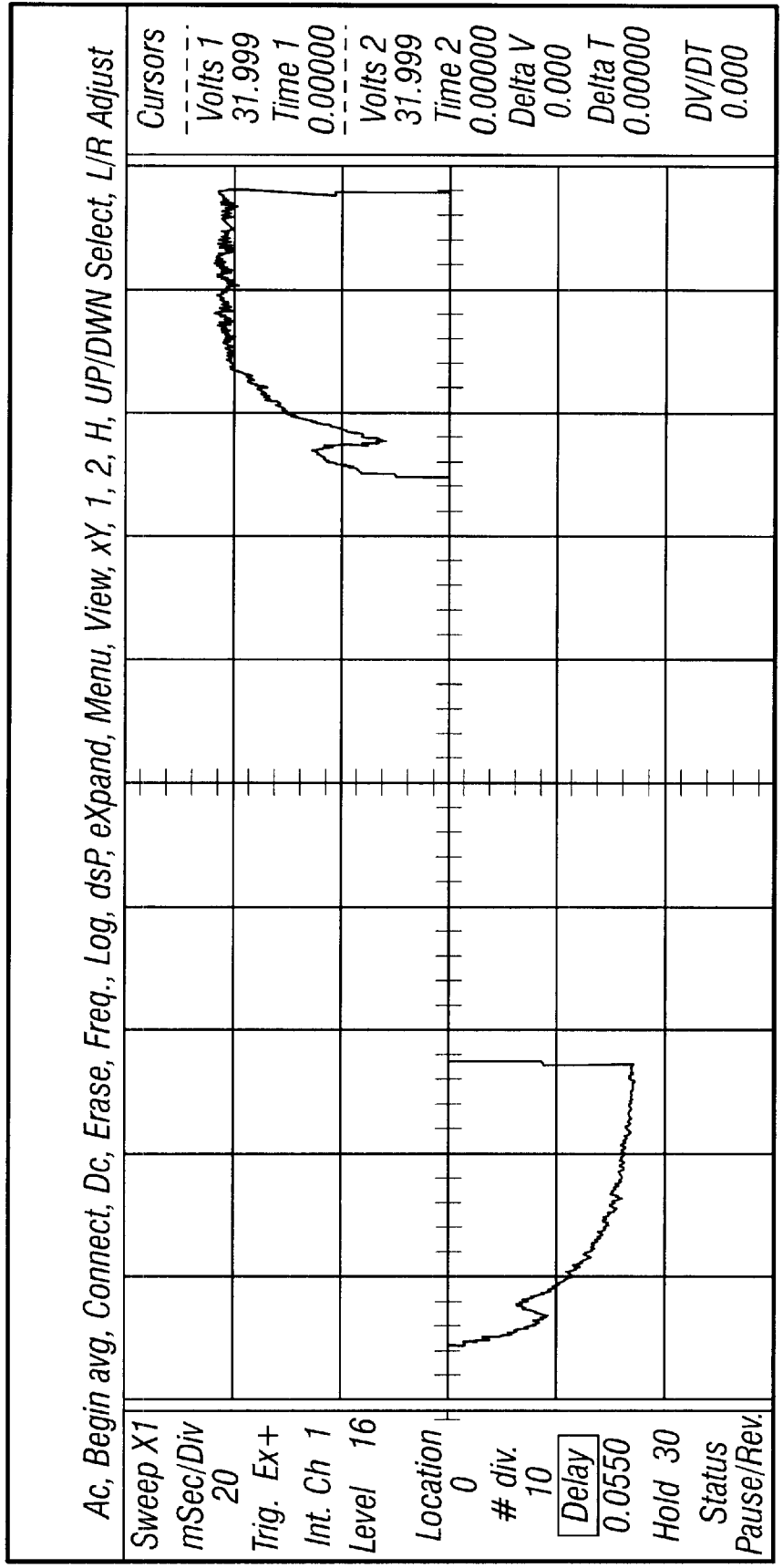
FIG. 4 contains an oscilloscope trace showing bipolar operating pulses for the magnetic latching device according to an embodiment of the present invention.

The Latch-Up Detector monitors the 'charging current' from the initial application of power to the magnetic assembly in an embodiment of the present invention, and 'looks' for the 'dip' in the current caused by the change in induction of the EMA that results from the EMA switching 'states'. (FIG. 4 contains an oscilloscope trace showing bipolar operating pulses for the magnetic latching device according to an embodiment of the present invention.) The operation of the latch-up detector is initiated and controlled by the sequencing of the Bi-Polar Pulse Driver control elements and the presetting of the multiplexer input of the gated differential amplifier within the latch-up detector. The multiplexer within the Latch-Up Detector is enabled by the active high master switch means enable signal from the Bi-Polar Pulse Driver via buss 106. This signal is also used to control the discharge of the storage capacitors within the inverted/non-inverted shunted peak detectors. This control allows the detectors to be used in a bi-polar configuration without any possibility of 'false' triggering.

In an embodiment of the present invention, the Latch-Up Detector provides output signal to the ADC within the Electronics Control Unit, via buss 128, that is representative of the current flow to the EMA of electromagnetic device. The split current sensor provides a current sensor and return path creating a bi-polar current trace (a current signal that goes positive and negative indicating direction of current flow). This arrangement of current sensing resistors and differential amplifiers produces a bi-polar signal.

In an embodiment of the present invention, this bi-polar signal is used to determine and verify the correct operation of the external remotely operated magnetic latching mechanism. The Latch-Up Detector receives a differential bipolar signal from the Bi-Polar Pulse Driver via buss 106 that is representative of the current flow through the split current sensing resistors located in the Bi-Polar Pulse Driver and a master Switch enable signal from the Bi-Polar Pulse Driver. The ECU uses two programming signals to operate the multiplexer within the Latch-Up Detector via buss 128. The Wave Form Generator provides the Latch-Up Detector multiplexer with a synthetic wave form representative of the wave form produced during latch-up of the EMA within the electromagnetic device via an internal buss within the Electronics Control Unit. This signal is used to check operation of the latch-up detector circuits as part of the post diagnostics routine. In an embodiment of the present invention, the post-diagnostics require multiple operating pulses to completely check the operation of the electronics. These multiple operating pulses enhance the magnetic 'clamping' forces of the magnetic circuit elements associated with the EMA and the ferromagnetic material of the closed magnetic circuit, resulting in increased performance of the external remotely operated magnetic latching mechanism. The Wave Form Generator receives pulse width modulated signals from the microcontroller via an internal buss within the Electronics Control Unit, allowing the PWM-to analog converters within the Wave Form Generators to produce a differential analog output signal which is representative of the actual latch-up signal produced by the electromagnetic device.

The Latch-Up Detector of an embodiment of the present invention contains circuitry that process the bi-polar current representative signals from the Bi-Polar Pulse Driver, thereby detecting the 'dip' caused by the EMA changing magnetically latched position. The Latch-Up Detector provides positional information and latch-up verification to the EMA Position indicator via buss 139. The EMA Position Indicator also transfers this data to the ECU via buss 126, which generates a microcontroller interrupt upon a change in status of the input signal. Buss 126 also contains a tri-state signal pair for operating the bi-polar LED drivers in turn to operate the Apply-Release Switch Operator illumination LED's. The power for operation of these illumination LED's within the Apply-Release Switch Operator is provided by buss 116.

In an embodiment of the present invention, the system includes a unique serial number placed on the printed circuit board, allowing cross-referencing of manufacturing information in the event of repair or service.

Preferably, the system 500 performs several types of diagnostic routines. These routines can include (1) power up diagnostics, these diagnostics are performed when the car is turned on; (2) failure diagnostics, these diagnostics are performed when the system detects an operation failure, for example, if the system detects a failure of the electromagnetic device to latch up or release; and (3) voltage check, the system performs this diagnostic routine to determine if the voltage going to the electromechanical device 504 is either too high or too low. These routines are preferably performed at certain times during the operation of the device and these routines are run by the ECU 708.

Figure 8:
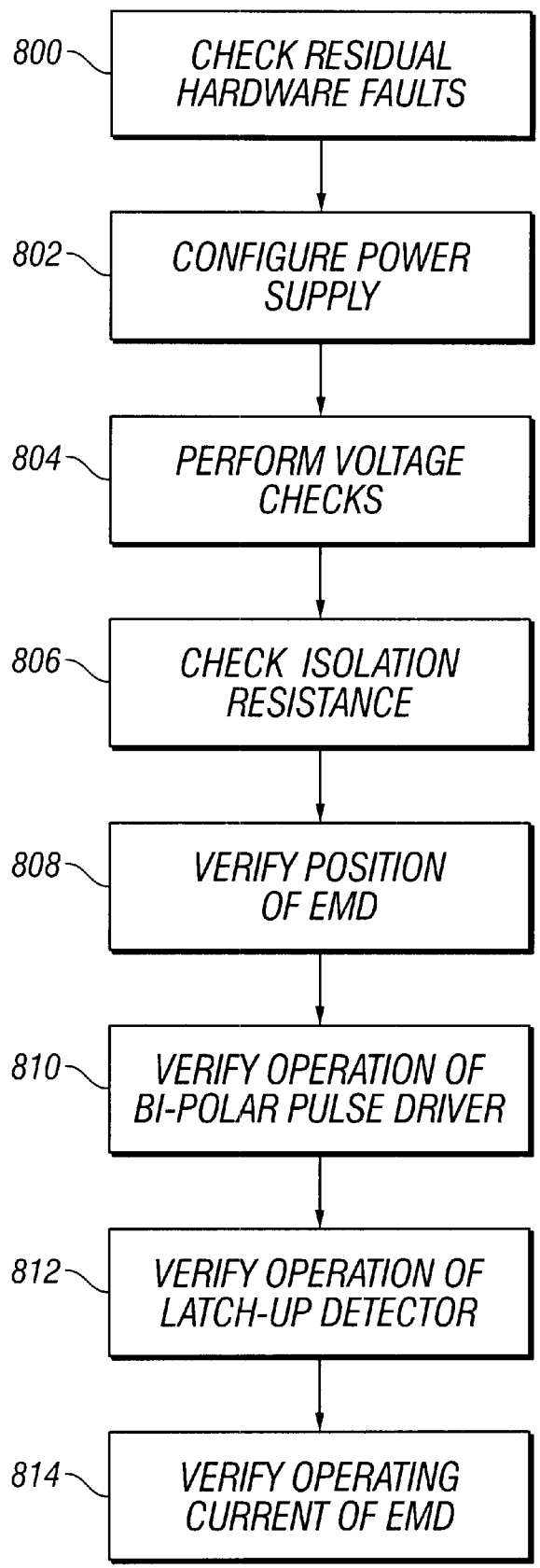
FIG. 8 is a flow diagram according to a preferred embodiment of the present invention.

FIG. 8 shows a flow diagram of the power up diagnostic routine. The first step 800 of this diagnostic routine is to check the residual hardware faults. The residual hardware faults are checked by checking non-volatile memory contained within the fault monitor 710.

The second step 802 is to configure the power supply 722. The power supply 722 is configured by turning on the entire power supply 722 on or selected portions of the power supply, preferably, all of the sub-power supplies contained within power supply 722 except the power supply used by the Unscheduled Event Detector.

The third step 804 is to perform voltage checks and comparisons. The voltages of the four sub-power supplies contained within the power supply 722 are checked.

The fourth step 806 is to check the isolation resistance of the electromagnetic device 504. The isolation resistance is checked by examining the leakage current. Preferably, the Isolation Resistance Monitor 701 senses the leakage current and sends a signal to the Electronic Control Unit (ECU) 708. The ECU 708 interprets this signal to determine the integrity of the isolation resistance of the electromagnetic device 504.

The fifth step 808 is to verify the position of the electromagnetic device 504. The system 500 verifies the position of the electromagnetic device 504 by comparing its current position with a position stored in memory and with a residual switch position. The sixth step 810 is to verify the operation of the Bi-Polar Pulse Driver 702. The seventh step 812 is to verity the operation of the latch-up detector 704. The eighth step 814 is to verify the operating current of the electromagnetic device 504. The different steps of this diagnostic routine allow the system to perform diagnostics on both the system itself and on the electromagnetic device.

Figure 9:
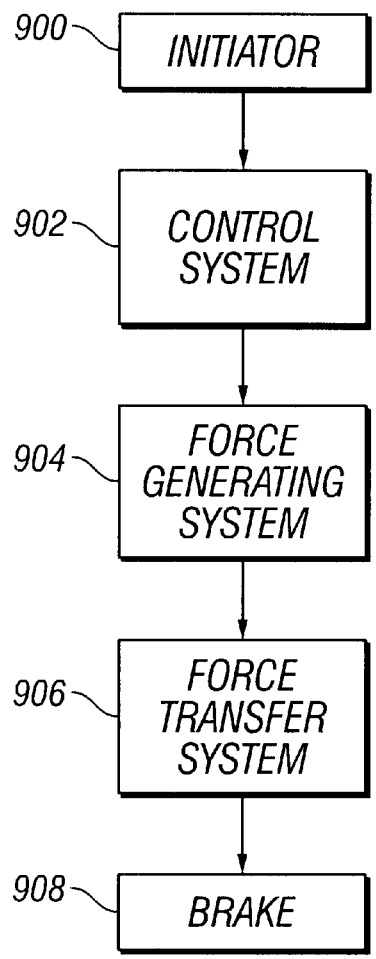
FIG. 9 is a schematic according to a preferred embodiment of the present invention.

Preferably, the system 500 is used in a vehicle braking system, shown in FIG. 9, that includes the following components. An initiator 900 sends a control signal that requests operation of the braking system. The initiator 900 can be automatic or manual and the initiator 900 can be many different devices, for example, a switch, a solenoid, a sensor or a magnetic relay, could be used as an initiator 900. Preferably, a switch is used as the initiator 900.

The signal sent by the initiator 900 is received by a control system 902. The control system 902 is a system that is connected to a power source and a force generating system 904. The system 500 disclosed above may be used as control system 902. The control system 902 controls energy delivered to the force generating system 904 from the power source.

A force generating system 904 is used to produce the required force necessary to actuate the brake 908. The force generating system 904 can be any suitable force generating system, however, the force generating system 904 is preferably an electric motor or a magnetic latching device. In an exemplary embodiment of the invention that uses an electric motor, the electric motor used is the one disclosed in U.S. Pat. No. 5,004,077 to Carlson et al., which is incorporated by reference herein. In an exemplary embodiment of the invention that uses a magnetic latch, the particular magnetic latch is the one disclosed in U.S. Pat. No. 5,443,132 to Arnold et al., which is incorporated by reference herein.

A force transfer system 906 transfers energy from the force generating system 904 to the brake 908. The force transfer system 906 can be any suitable device that is able to transfer the requisite energy from the force generating system 904 to the brake 908. Examples include a brake cable, a conductor, a hydraulic brake line, or any mechanical linkage. The preferred force transfer system is a conventional brake cable if an electric motor is used as the force generating system and the force transfer system disclosed in U.S. Pat. No. 5,443,132, if a magnetic latch is used as the force transfer system. The force transfer system can also include a force multiplication unit, such as a bell crank, a cam, or a mechanical linkage to aid in the application of brake 908, as disclosed in U.S. Patent No. 5,180,038 to Arnold, et al., which is incorporated by reference herein.

Brake 908 can be any device that uses friction. A conventional disk or drum brake is preferred.

Any of the various disclosed components can be used alone, with other components, or with features or components of the present invention.

It will be apparent to those skilled in the art that various modifications and variations can be made in the system and method for controlling an electromagnetic device of the present invention without departing from the spirit or scope of the invention.

The foregoing disclosure of embodiments of the present invention has been presented for purposes of illustration and description. It is not exhaustive or intended to limit the invention to the precise forms disclosed herein. Many variations and modifications of the embodiments described herein will be obvious to one of ordinary skill in the art in light of the above disclosure. The scope of the invention is to be defined only by the claims appended hereto, and by their equivalents.

What is claimed is:

1. A parking braking system for use in a vehicle comprising:

(a) an initiator for sending a control signal, (b) a power management system, adapted for connection to a power source and a force generating system comprising at least one magnetically biased device, wherein the power management system controls energy delivered to the force generating system from the power source, (c) a force transfer system connected to the force generating system, the force transfer system adapted to transfer force from the force generating system to a parking brake system; wherein (d) the parking braking system performs at least one diagnostic check.

2. A parking braking system for use in a vehicle comprising:

(d) an initiator for sending a control signal, (e) a power management system, adapted for connection to a power source and a force generating system comprising at least one magnetically biased device, wherein the power management system controls energy delivered to the force generating system from the power source;

(f) a force transfer system connected to the force generating system, the force transfer system adapted to transfer force from the force generating system to a parking brake; wherein the power management system monitors current in said force transfer system.

3. The parking brake system of claim 2 wherein said power management system monitors current profile.

4. The parking brake of system of claim 2 wherein said power management system monitors changes in current.

* * * * *